(12) United States Patent
Sharma et al.

(10) Patent No.: US 9,085,414 B2
(45) Date of Patent: Jul. 21, 2015

(54) SIDE-FLEXING CONVEYORS

(71) Applicant: Solus Industrial Innovations, LLC, Florence, KY (US)

(72) Inventors: Apaar Sharma, Chattisgarh (IN); Shivakumar Chougule, Maharashtra (IN)

(73) Assignee: Solus Industrial Innovations, LLC, Florence, KY (US)

( * ) Notice: Subject to any disclaimer, the term of this patent is extended or adjusted under 35 U.S.C. 154(b) by 0 days.

(21) Appl. No.: 14/092,086

(22) Filed: Nov. 27, 2013

(65) Prior Publication Data

US 2014/0231227 A1    Aug. 21, 2014

(30) Foreign Application Priority Data

Nov. 29, 2012 (IN) .......................... 3396/MUM/2012

(51) Int. Cl.
    B65G 17/06    (2006.01)
    B65G 15/30    (2006.01)
    B65G 17/08    (2006.01)

(52) U.S. Cl.
    CPC .............. B65G 15/30 (2013.01); B65G 17/086 (2013.01)

(58) Field of Classification Search
    CPC ............................. B65G 17/086; B65G 15/02
    USPC .......................................... 198/853, 850, 851
    See application file for complete search history.

(56) References Cited

U.S. PATENT DOCUMENTS

| | | | |
|---|---|---|---|
| 1,996,586 A | 4/1935 | Meyer | |
| 2,234,537 A | 3/1941 | Blackburn | |
| 2,906,395 A | 9/1959 | Greer | |
| 3,467,239 A | 9/1969 | Roinestad | |
| 3,584,731 A | 6/1971 | Dahiem | |
| 3,651,924 A | 3/1972 | Homeier et al. | |
| 3,685,367 A | 8/1972 | Dawson | |
| 3,693,780 A | 9/1972 | Fraioli, Sr. | |
| 3,854,575 A | 12/1974 | Fraioli, Sr. | |
| 3,946,857 A | 3/1976 | Fraioli, Sr. | |

(Continued)

FOREIGN PATENT DOCUMENTS

| | | |
|---|---|---|
| CA | 2566004 A1 | 11/2005 |
| FR | 2846642 A1 | 5/2004 |

(Continued)

OTHER PUBLICATIONS

International Search Report and Written Opinion in corresponding International Patent Application No. PCT/US2013/072377, mailed Apr. 18, 2014, in 14 pages.

(Continued)

*Primary Examiner* — William R Harp
(74) *Attorney, Agent, or Firm* — Knobbe, Martens, Olson & Bear, LLP

(57) ABSTRACT

A conveyor including a side-flexing belt having a plurality of modules and a plurality of rods. Each module includes a central portion having a main region extending in a straight path, a plurality of front links each including a front aperture, a plurality of rear links each including a rear aperture, a plurality of front gaps between adjacent pairs of front links, and a plurality of rear gaps between adjacent pairs of rear links. A length of each front gap is substantially the same along substantially the entire thickness of an adjacent front link, and a length of each rear gap is substantially the same along the entire thickness of an adjacent rear link.

24 Claims, 25 Drawing Sheets

(56) References Cited

U.S. PATENT DOCUMENTS

| | | | | |
|---|---|---|---|---|
| 4,037,713 | A | 7/1977 | Soliman et al. | |
| 4,089,406 | A | 5/1978 | Teske et al. | |
| 4,153,152 | A | 5/1979 | Lapeyre | |
| 4,222,483 | A | 9/1980 | Wootton et al. | |
| 4,280,620 | A | 7/1981 | Baker, Jr. | |
| 4,645,070 | A | 2/1987 | Homeier | |
| 4,645,476 | A | 2/1987 | King et al. | |
| 4,742,907 | A | 5/1988 | Palmaer | |
| 4,865,184 | A | 9/1989 | Wechner | |
| 4,867,301 | A | 9/1989 | Roinestad et al. | |
| 4,893,710 | A | 1/1990 | Bailey et al. | |
| 4,901,844 | A | 2/1990 | Palmaer et al. | |
| 4,919,252 | A | 4/1990 | Wechner | |
| 4,934,517 | A | 6/1990 | Lapeyre | |
| 4,940,133 | A | 7/1990 | Roinestad et al. | |
| 4,949,838 | A * | 8/1990 | Lapeyre et al. | 198/853 |
| 4,951,807 | A | 8/1990 | Roinestad et al. | |
| 4,953,693 | A | 9/1990 | Draebel | |
| 4,957,597 | A | 9/1990 | Irwin | |
| 4,972,942 | A | 11/1990 | Faulkner | |
| 5,004,097 | A | 4/1991 | Roinestad et al. | |
| 5,031,757 | A | 7/1991 | Draebel et al. | |
| 5,070,999 | A | 12/1991 | Layne et al. | |
| 5,072,826 | A | 12/1991 | Wechner | |
| 5,105,938 | A * | 4/1992 | Tan | 198/853 |
| 5,125,504 | A | 6/1992 | Corlett et al. | |
| 5,127,515 | A | 7/1992 | Damkjaer | |
| 5,131,526 | A | 7/1992 | Kaak | |
| 5,139,135 | A | 8/1992 | Irwin et al. | |
| 5,141,099 | A | 8/1992 | Baumgartner | |
| 5,141,102 | A | 8/1992 | Roinestad et al. | |
| 5,174,439 | A | 12/1992 | Spangler et al. | |
| 5,176,247 | A | 1/1993 | Counter et al. | |
| 5,181,601 | A | 1/1993 | Palmaer et al. | |
| 5,197,591 | A | 3/1993 | Roinestad et al. | |
| 5,217,110 | A | 6/1993 | Spangler et al. | |
| 5,224,583 | A | 7/1993 | Palmaer et al. | |
| 5,253,749 | A | 10/1993 | Ensch | |
| 5,271,491 | A | 12/1993 | Irwin | |
| 5,303,817 | A | 4/1994 | Kissee | |
| 5,303,818 | A | 4/1994 | Gruettner et al. | |
| 5,307,923 | A | 5/1994 | Damkjaer | |
| 5,310,046 | A | 5/1994 | Palmaer et al. | |
| 5,318,169 | A | 6/1994 | Faulkner et al. | |
| 5,330,046 | A | 7/1994 | Yuzawa et al. | |
| 5,335,768 | A * | 8/1994 | Schladweiler | 198/853 |
| 5,346,059 | A | 9/1994 | Irwin | |
| 5,358,096 | A | 10/1994 | Faulkner et al. | |
| 5,372,248 | A | 12/1994 | Horton | |
| 5,375,697 | A | 12/1994 | Battati et al. | |
| 5,379,883 | A * | 1/1995 | Damkjaer | 198/853 |
| 5,402,877 | A | 4/1995 | Thiele et al. | |
| 5,419,428 | A | 5/1995 | Palmaer et al. | |
| 5,429,227 | A | 7/1995 | Krossmann et al. | |
| 5,431,275 | A | 7/1995 | Faulkner | |
| 5,469,958 | A | 11/1995 | Gruettner et al. | |
| 5,489,020 | A | 2/1996 | Clopton | |
| 5,501,319 | A | 3/1996 | Larson et al. | |
| 5,547,071 | A | 8/1996 | Palmaer et al. | |
| 5,558,204 | A | 9/1996 | Daringer | |
| 5,562,200 | A | 10/1996 | Daringer | |
| 5,566,817 | A | 10/1996 | Meeker | |
| 5,573,105 | A | 11/1996 | Palmaer | |
| 5,573,106 | A | 11/1996 | Stebnicki | |
| 5,598,916 | A | 2/1997 | Horton et al. | |
| 5,613,597 | A | 3/1997 | Palmaer et al. | |
| 5,622,252 | A | 4/1997 | Raum | |
| 5,645,160 | A | 7/1997 | Palmaer et al. | |
| 5,662,211 | A | 9/1997 | Quentin | |
| 5,690,210 | A | 11/1997 | Layne | |
| 5,697,492 | A | 12/1997 | Damkjaer | |
| 5,738,205 | A | 4/1998 | Draebel | |
| 5,775,480 | A | 7/1998 | Lapeyre et al. | |
| 5,779,027 | A | 7/1998 | Ensch et al. | |
| 5,791,455 | A | 8/1998 | Clopton | |
| 5,797,820 | A | 8/1998 | Endo | |
| 5,816,390 | A | 10/1998 | Stebnicki | |
| 5,826,705 | A | 10/1998 | Ramsey et al. | |
| 5,881,863 | A | 3/1999 | Borner | |
| 5,904,241 | A | 5/1999 | Verdigets et al. | |
| 5,906,270 | A | 5/1999 | Faulkner | |
| 5,921,379 | A | 7/1999 | Horton | |
| 5,927,479 | A | 7/1999 | Merten et al. | |
| 5,947,265 | A | 9/1999 | Merten et al. | |
| 5,954,187 | A | 9/1999 | Hager | |
| 5,960,937 | A | 10/1999 | Stebnicki et al. | |
| 5,966,923 | A | 10/1999 | Nakamura | |
| 6,006,898 | A | 12/1999 | Odink | |
| 6,036,001 | A | 3/2000 | Stebnicki et al. | |
| 6,036,002 | A | 3/2000 | Kobayashi et al. | |
| 6,041,917 | A | 3/2000 | Layne | |
| 6,050,397 | A | 4/2000 | Kato et al. | |
| 6,073,756 | A | 6/2000 | Damkjaer et al. | |
| 6,079,543 | A | 6/2000 | Palmaer | |
| 6,079,552 | A | 6/2000 | Reichert et al. | |
| 6,125,995 | A | 10/2000 | Layne et al. | |
| 6,129,202 | A | 10/2000 | Layne et al. | |
| 6,142,294 | A | 11/2000 | Kobayashi et al. | |
| 6,142,295 | A | 11/2000 | Greve | |
| 6,196,379 | B1 | 3/2001 | Van Esch et al. | |
| 6,196,381 | B1 | 3/2001 | Kato et al. | |
| 6,202,834 | B1 | 3/2001 | Layne et al. | |
| 6,209,716 | B1 | 4/2001 | Bogle et al. | |
| 6,213,292 | B1 | 4/2001 | Takahashi et al. | |
| 6,216,854 | B1 | 4/2001 | Damkjaer et al. | |
| 6,223,889 | B1 | 5/2001 | Layne et al. | |
| 6,253,911 | B1 | 7/2001 | Layne et al. | |
| 6,298,982 | B1 | 10/2001 | Layne et al. | |
| 6,305,530 | B1 | 10/2001 | Guldenfels | |
| 6,330,941 | B1 * | 12/2001 | Guldenfels | 198/853 |
| 6,345,715 | B2 | 2/2002 | Palmaer | |
| 6,357,581 | B1 | 3/2002 | Guldenfels | |
| 6,360,882 | B1 | 3/2002 | Maine, Jr. et al. | |
| 6,364,094 | B1 | 4/2002 | Alstmar | |
| 6,364,095 | B1 | 4/2002 | Layne et al. | |
| 6,371,284 | B1 | 4/2002 | Pasch | |
| 6,382,404 | B1 | 5/2002 | Guldenfels | |
| 6,382,405 | B1 | 5/2002 | Palmaer | |
| 6,386,355 | B1 | 5/2002 | Willems | |
| 6,390,285 | B2 | 5/2002 | De Geus et al. | |
| 6,401,914 | B1 | 6/2002 | Greve | |
| 6,425,479 | B1 | 7/2002 | Guldenfels et al. | |
| 6,439,378 | B1 | 8/2002 | MacLachlan | |
| 6,471,046 | B2 | 10/2002 | Layne et al. | |
| 6,471,048 | B1 | 10/2002 | Thompson, Jr. et al. | |
| 6,474,464 | B1 | 11/2002 | Horton et al. | |
| 6,484,379 | B2 | 11/2002 | Palmaer | |
| 6,491,152 | B1 | 12/2002 | Evers, Jr. et al. | |
| 6,516,944 | B2 | 2/2003 | Guldenfels | |
| 6,523,680 | B2 | 2/2003 | Guldenfels | |
| 6,578,704 | B1 | 6/2003 | MacLachlan | |
| 6,581,758 | B1 | 6/2003 | van-Zijderveld et al. | |
| 6,585,110 | B2 | 7/2003 | Layne et al. | |
| 6,591,967 | B1 | 7/2003 | Doudement et al. | |
| 6,615,979 | B2 | 9/2003 | Etherington et al. | |
| 6,644,466 | B2 | 11/2003 | Knott et al. | |
| 6,662,938 | B2 | 12/2003 | Damkjaer | |
| 6,672,451 | B1 | 1/2004 | Thompson, Jr. et al. | |
| 6,705,460 | B2 | 3/2004 | Weiser et al. | |
| 6,705,461 | B2 | 3/2004 | Kuharevicz et al. | |
| 6,758,776 | B2 | 7/2004 | Fye et al. | |
| 6,766,899 | B1 | 7/2004 | Guldenfels | |
| 6,779,652 | B2 | 8/2004 | Baier et al. | |
| 6,793,069 | B2 | 9/2004 | Guldenfels | |
| RE38,607 | E | 10/2004 | Guldenfels et al. | |
| 6,827,204 | B2 | 12/2004 | Cribiu' | |
| 6,837,367 | B1 | 1/2005 | Klein et al. | |
| 6,874,617 | B1 | 4/2005 | Layne | |
| 6,880,696 | B2 | 4/2005 | Cediel et al. | |
| 6,896,126 | B2 | 5/2005 | Guldenfels | |
| 6,910,572 | B2 | 6/2005 | Shibayama et al. | |
| 6,918,486 | B2 | 7/2005 | Shibayama et al. | |
| 6,948,613 | B2 | 9/2005 | Guldenfels et al. | |
| 7,051,870 | B2 | 5/2006 | Schoendienst et al. | |

(56) References Cited

U.S. PATENT DOCUMENTS

| | | |
|---|---|---|
| 7,070,043 B1 | 7/2006 | MacLachlan et al. |
| 7,073,662 B2 | 7/2006 | Neely et al. |
| 7,080,729 B2 | 7/2006 | Guldenfels et al. |
| 7,108,126 B2 | 9/2006 | Layne et al. |
| 7,108,127 B2 | 9/2006 | Krisl |
| 7,147,099 B2 | 12/2006 | Guernsey et al. |
| 7,159,709 B2 | 1/2007 | Petrovic |
| 7,168,557 B2 | 1/2007 | Mitchell et al. |
| 7,228,959 B1 | 6/2007 | Harrison |
| 7,234,589 B2 | 6/2007 | Sedlacek |
| 7,244,205 B2 | 7/2007 | Kanaris |
| 7,252,192 B2 | 8/2007 | Stebnicki et al. |
| 7,267,222 B2 | 9/2007 | Montemartini et al. |
| 7,281,626 B2 | 10/2007 | Guldenfels |
| 7,284,657 B2 | 10/2007 | Ulsh et al. |
| 7,293,644 B2 | 11/2007 | Stebnicki et al. |
| 7,314,132 B2 | 1/2008 | Layne et al. |
| 7,331,447 B2 | 2/2008 | Krisl et al. |
| 7,364,036 B2 | 4/2008 | Schoepf |
| 7,367,448 B2 | 5/2008 | Fandella |
| 7,410,047 B2 | 8/2008 | van Faassen |
| 7,419,051 B2 | 9/2008 | Damkjaer |
| 7,438,179 B2 | 10/2008 | Gundlach |
| 7,441,649 B2 | 10/2008 | Layne et al. |
| 7,494,005 B2 | 2/2009 | Messick, Jr. et al. |
| 7,494,006 B2 | 2/2009 | Knott et al. |
| 7,530,454 B2 | 5/2009 | Neely et al. |
| 7,556,143 B2 | 7/2009 | Crooks |
| 7,556,145 B2 | 7/2009 | Elsner |
| 7,559,421 B1 | 7/2009 | McDaniel et al. |
| 7,559,422 B2 | 7/2009 | Layne et al. |
| 7,600,632 B2 | 10/2009 | Hall |
| 7,600,633 B2 | 10/2009 | Rathbun et al. |
| 7,604,111 B2 | 10/2009 | Zmaj |
| 7,624,858 B2 | 12/2009 | Delair et al. |
| 7,635,060 B2 | 12/2009 | Lagneaux |
| 7,661,524 B2 | 2/2010 | Damkjaer |
| 7,690,501 B2 | 4/2010 | Menke et al. |
| 7,699,160 B2 | 4/2010 | Marsetti |
| 7,753,193 B2 | 7/2010 | Kanaris |
| 7,766,159 B2 | 8/2010 | Krisl |
| 7,802,675 B2 | 9/2010 | Hall |
| 7,828,136 B2 | 11/2010 | Damkjaer |
| 7,837,028 B2 * | 11/2010 | Elsner ................. 198/850 |
| 7,837,029 B2 | 11/2010 | Russell |
| 7,841,462 B2 | 11/2010 | Layne et al. |
| 7,850,001 B2 | 12/2010 | Krisl |
| 7,854,315 B2 | 12/2010 | Stebnicki et al. |
| 7,967,132 B2 | 6/2011 | Menke et al. |
| 7,975,840 B2 | 7/2011 | Messick, Jr. et al. |
| 7,987,974 B2 | 8/2011 | Montgomery et al. |
| 8,002,109 B2 | 8/2011 | Rogers et al. |
| 8,047,356 B2 | 11/2011 | Elsner |
| 8,083,053 B2 | 12/2011 | Paardekooper et al. |
| 8,113,340 B1 | 2/2012 | Smith et al. |
| 2001/0050214 A1 | 12/2001 | Guldenfels |
| 2002/0117382 A1* | 8/2002 | Maine, Jr. ................. 198/853 |
| 2002/0175056 A1 | 11/2002 | Damkjar |
| 2002/0179417 A1 | 12/2002 | Cediel et al. |
| 2002/0195321 A1 | 12/2002 | Guldenfels |
| 2003/0057061 A1 | 3/2003 | Guldenfels |
| 2003/0192777 A1 | 10/2003 | Guldenfels |
| 2004/0045795 A1 | 3/2004 | Guldenfels |
| 2004/0140182 A1 | 7/2004 | Morris |
| 2005/0109589 A1 | 5/2005 | Guldenfels |
| 2005/0241922 A1 | 11/2005 | Petrovic |
| 2006/0237290 A1 | 10/2006 | Guldenfels et al. |
| 2006/0249359 A1 | 11/2006 | Pasch |
| 2006/0266627 A1 | 11/2006 | Krisl |
| 2007/0175736 A1 | 8/2007 | Bickel, Jr. et al. |
| 2008/0011587 A1 | 1/2008 | Stebnicki et al. |
| 2008/0023304 A1 | 1/2008 | Elsner |
| 2008/0083598 A1 | 4/2008 | Guldenfels |
| 2008/0210528 A1 | 9/2008 | Menke et al. |
| 2009/0014290 A1 | 1/2009 | Jansen et al. |
| 2009/0057108 A1 | 3/2009 | Paardekooper et al. |
| 2009/0266682 A1 | 10/2009 | Elsner |
| 2009/0277758 A1 | 11/2009 | Marshall |
| 2009/0308716 A1 | 12/2009 | Marsetti |
| 2010/0065405 A1 | 3/2010 | Lagneaux |
| 2010/0175969 A1 | 7/2010 | Marsetti |
| 2010/0236901 A1 | 9/2010 | Marshall |
| 2010/0282577 A1 | 11/2010 | Rettore et al. |
| 2011/0017576 A1 | 1/2011 | Andersen |
| 2011/0094856 A1 | 4/2011 | Guldenfels et al. |
| 2011/0100784 A1 | 5/2011 | Prakasam et al. |
| 2011/0226593 A1 | 9/2011 | Hall et al. |
| 2011/0278136 A1 | 11/2011 | Weiser et al. |
| 2012/0037480 A1 | 2/2012 | Meulenkamp et al. |
| 2012/0125742 A1 | 5/2012 | Corley et al. |
| 2014/0231226 A1 | 8/2014 | Sharma et al. |

FOREIGN PATENT DOCUMENTS

| | | |
|---|---|---|
| JP | 03-714873 B2 | 9/2005 |
| JP | 03-798318 B2 | 7/2006 |
| SE | 211992 | 11/1966 |
| WO | WO 2014/085688 A2 | 6/2014 |

OTHER PUBLICATIONS

2256 Series 1" pitch side flexing belt for material handling/logistics purposes, Jun. 2010, 4 pages.

Re-Examination Application No. 95/000,071, Filed Jan. 26, 2005, Guldenfels.

* cited by examiner

SIDE-FLEXING CONVEYORS

CROSS REFERENCE TO RELATED APPLICATIONS

All applications for which a foreign or domestic priority claim is identified in the Application Data Sheet as filed with the present application are hereby incorporated by reference herein under 37 C.F.R. §1.57.

The present application claims the priority benefit under at least 35 U.S.C. §119 of Indian Patent Application No. 3396/MUM/2012, filed Nov. 29, 2012, the entirety of which is hereby incorporated by reference herein.

BACKGROUND

1. Field

The present disclosure generally relates to conveyors for moving items, and specifically to conveyors capable of flexing in one or more lateral directions.

2. Description of the Related Art

Conveyors can be used to convey products along a track from one location to one or more other locations. Some conveyors are configured to flex in one or more lateral directions to change the direction of travel of products moving on the conveyors. Some of these conveyors comprise belts or chains on which products are disposed. The conveyors can be moved with a drive mechanism comprising one or more sprockets and motors.

SUMMARY

A variety of illustrative conveyors, conveyor components, and conveyor systems are disclosed to illustrate various examples to achieve one or more advantages. These examples are only illustrative and not intended in any way to restrict the general disclosure presented and the various aspects and features of the disclosure.

According to some embodiments, a conveyor adapted to travel through straight and curved paths includes a plurality of modules. Each of the modules can have width, height, and thickness. The width can extend between a first lateral side of the module and a second lateral side of the module. The height can extend between a top surface of the module and a bottom surface of the module. The thickness can extend generally parallel to the direction of travel of the conveyor between a leading portion of the module and a trailing portion of the module.

In certain embodiments, each of the modules include one or more of the following features. In some embodiments, each of the modules has a spine that extends from the first lateral side of the module to the second lateral side of the module. The spine can have a thickness extending from a front edge to a rear edge. In certain implementations, the spine comprises a continuous (e.g., uninterrupted) straight portion. The continuous straight portion can extend from the first lateral side to the second lateral side. For example, in some variants, the continuous straight portion extends along a line drawn between a first point within the thickness of the spine at the first lateral side and a second point within the thickness of the spine at the second lateral side.

In some embodiments, each of the modules include one or more of the following features. In some embodiments, each of the modules include a plurality of front links. The front links can extend at an angle relative to the spine, such as extending generally perpendicular to the spine. Each of the plurality of front links can have a first end connected with the front edge of the spine and a second end opposite the first end. The second end can terminate in a front tip. The second end can have a width that is less than or equal to the width of the front link at the first end. In some implementations, the second end does not include a bulbous head portion. Each of the front links can have a front link length. The front link length can be measured from the front edge of the spine to the corresponding front tip. In some implementations, the front link length of each of the front links is generally equal. In some embodiments, each of the front tips touch a line drawn parallel to the spine and from the first lateral side to the second lateral side. In some variants, the front tips are aligned. Each of the modules can include a plurality of front gaps. Each of the plurality of front gaps can be bounded by a portion of the front edge of the spine and by lateral sides of adjacent front links. Each of the modules can include a plurality of first front apertures. Each of the plurality of front links can include one of the first front apertures.

In certain implementations, each of the modules include one or more of the following features. In some embodiments, each of the modules includes a plurality of rear links. The rear links can extend at an angle relative to the spine, such as extending generally perpendicular to the spine. Each of the plurality of rear links can have a first end connected with the rear edge of the spine and a second end opposite the first end. The second end can terminate in a rear tip. The second end can have a width that is less than or equal to the width of the rear link at the first end. In some implementations, the second end does not include a bulbous head portion. Each of the rear links can have a rear link length. The rear link length can be measured from the rear edge of the spine to the corresponding rear tip. In some embodiments, the rear link length of each of the rear links is generally equal. In some embodiments, each of the rear tips touch a line drawn parallel to the spine and from the first lateral side to the second lateral side. In some variants, the rear tips are aligned. Each of the modules can include a plurality of rear gaps. Each of the plurality of rear gaps can be bounded by a portion of the rear edge of the spine and by lateral sides of adjacent rear links. In some embodiments, each of the modules has a plurality of rear apertures. Each of the plurality of rear links can include one of the rear apertures. The rear apertures can be elongate in cross-sectional shape, circular in cross-sectional shape, rectangular in cross-sectional shape, or otherwise. Each of the front gaps can be configured to receive one of the rear links of a frontwardly-adjacent module. Each of the rear gaps can be configured to receive one of the front links of a rearwardly-adjacent module.

In certain embodiments, each of the modules include one or more of the following features. In certain variants, each of the modules include a plurality of rods. Each rod can be configured to extend through each of the front apertures of a first module and extend through each of the rear apertures of a second module. This can pivotally connect the first and second modules. In some embodiments, the first and second modules are each configured to slide and twist relative to each other within a plane of travel of the conveyor, thereby facilitating flexing of the conveyor through curved paths.

In some embodiments, the conveyor includes one or more of the following features. In certain variants, the plurality of modules are arranged in a brick-lay pattern. In some implementations, the thickness of the spine is generally constant at the top surface of the module. In some embodiments, each of the front links is generally continuous between the top surface and the bottom surface. In some variants, each of the front links does not include a generally vertical hole extending through the top and bottom surfaces of the module. In certain embodiments, the thickness of the spine is generally constant between the top surface and the bottom surface of the module.

In some embodiments, the conveyor includes one or more of the following features. The conveyor can also include a plurality of second front apertures. Each of the plurality of front links can include one of the second front apertures. In some variants, the first and second front apertures intersect. In some embodiments, each of the second front apertures is sized so as to inhibit the rod from entering the second front aperture. In some variants, in each front link, the front aperture and the second aperture together form a key-hole shape. In some implementations, each of the plurality of front links includes at least a portion of one of the second front apertures. The second front apertures can be configured to reduce the weight of the module. In some embodiments, the second front aperture is spaced apart from the first front aperture. In some variants, a portion of the second front aperture is positioned in the spine.

In certain embodiments, the conveyor includes one or more of the following features. In some variants, at least a majority of a top surface of the spine is generally planar. In some embodiments, the spine is asymmetrical along a cross section taken perpendicular to the top surface and parallel to the direction of travel the conveyor. In some implementations, the first front apertures is a round hole.

In some embodiments, the conveyor includes one or more of the following features. In certain implementations, at least one of the modules includes a rod securing link with an opening configured to receive an end of one of the rods. In some embodiments, an end portion of at least one front link is tapered toward the front tip. In some variants, a majority of the front links include a uniform shape. In some embodiments, an end portion of at least one rear link is tapered. In some implementations, a majority of the rear links include a uniform shape.

According to certain embodiments, a conveyor belt that is adapted to travel along straight and curved paths can include a plurality of rows of belt modules. The belt modules can extend from a first lateral side of the conveyor to a second lateral side of the conveyor belt. The conveyor belt can also include a plurality of rods. Each of the rods can have a flange and configured to pivotally interlock adjacent rows of the belt module. In some embodiments, each row of belt modules have a first module, a second module, and a third module. The second module can be laterally adjacent a first side of the first module. The third module can be laterally adjacent a second side of the first module.

In some embodiments, each of the first, second, and third modules can include one or more of the following features. The first, second, and third modules can each include a spine extending between a top surface and a bottom surface. The spine can include a continuous straight portion that extends from a first lateral side of the module to a second lateral side of the module. The spine can have a thickness that extends generally in the direction of belt travel between a front edge and a rear edge. In some embodiments, the first, second, and third modules can each include a plurality of front links connected with the front edge of the spine. The front links can extend from the spine, such as generally perpendicular to the spine. Each of the plurality of front links can have a front end. In certain implementations, the first, second, and third modules can each include a plurality of front apertures. The front apertures can be configured to receive one of the rods. Each of the plurality of front links can include one of the front apertures. The front apertures can have an elongate cross-sectional shape.

In some embodiments, each of the first, second, and third modules can include one or more of the following features. The first, second, and third modules can each include a plurality of rear links connected with the rear edge of the spine and extending from the spine, such as generally perpendicular to the spine. Each of the plurality of rear links can have a rear end. In some embodiments, the first, second, and third modules can each include a plurality of rear apertures configured to receive one of the rods. Each of the plurality of rear links can include one of the rear apertures.

In some embodiments, the third link further comprises a rod-securing front link. The rod-securing front link can be located at the first lateral side of the conveyor. In some variants, the rod-securing front link extends generally parallel to the plurality of front links. The rod-securing front link can have an opening configured to receive one of the rods. The opening can have a cross-sectional shape that is different than the cross-sectional shape of the front apertures. For example, the opening can have a circular cross-sectional shape. The rod-securing front link can be configured to facilitate fixing the rod with respect to the third module, thereby inhibiting the rod from moving laterally relative to the row of belt modules.

In certain embodiments, the conveyor belt includes one or more of the following features. The thickness of the spine can be generally constant at or near at least one of the top and bottom surfaces. The thickness of the spine can be generally constant at the top and bottom surfaces. The front end can have a width that is less than or equal to the width of the corresponding front link. The rear end can have a width that is less than or equal to the width of the corresponding rear link. The front links of each of the first, second, and third modules further can include a second front aperture. The front apertures can have a key-hole shape.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

DETAILED DESCRIPTION OF CERTAIN EMBODIMENTS

Figure 1:
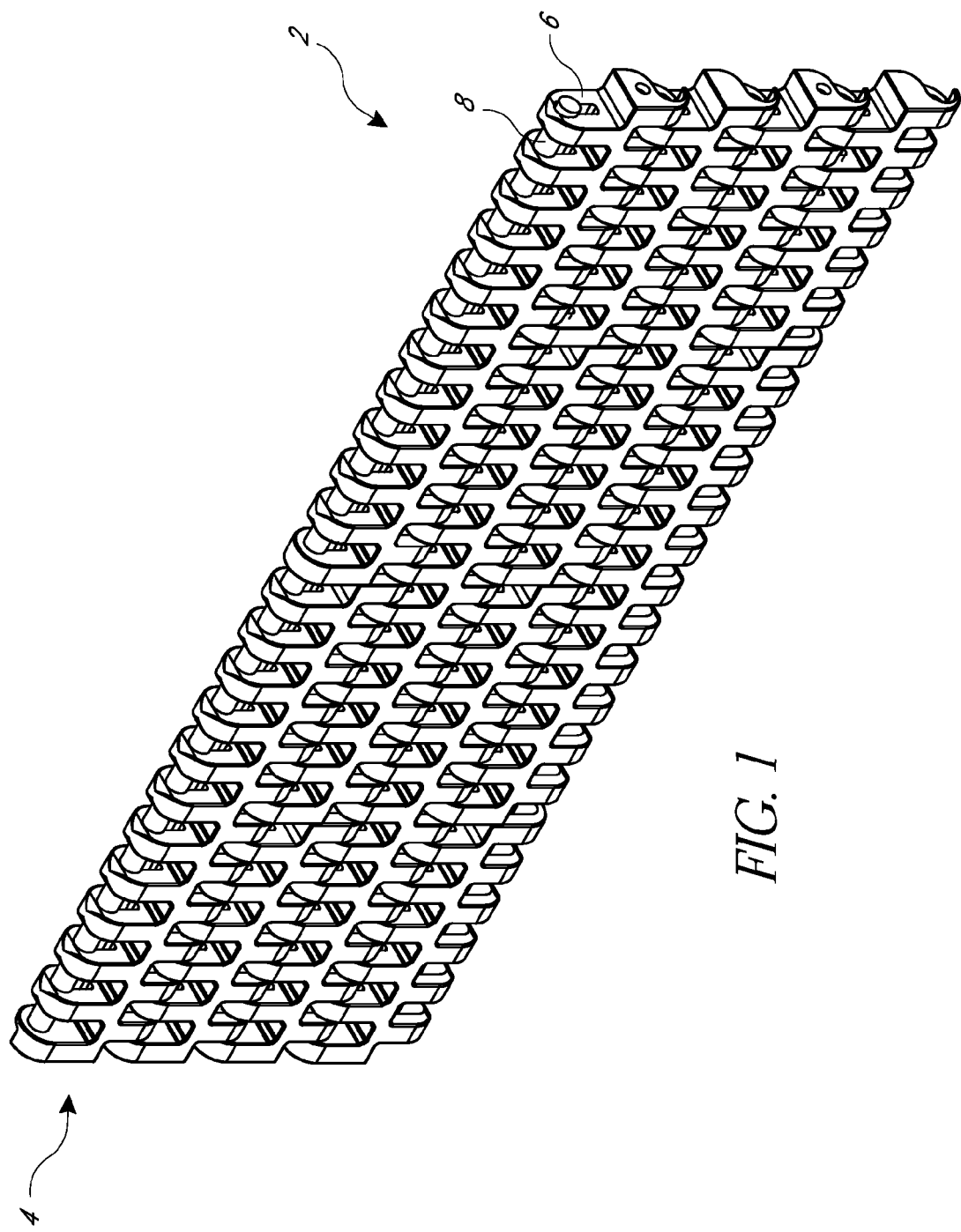
FIG. 1 illustrates a perspective view of a portion of a side-flexing conveyor in a straight configuration.

The conveyor systems described herein illustrate various examples that may be employed to achieve one or more advantages. These examples are only illustrative and not intended in any way to restrict the general disclosure presented and the various aspects and features of the disclosure. Not all embodiments will achieve advantages described herein. Furthermore, the phraseology and terminology used herein is for the purpose of description and should not be regarded as limiting. Any structure, feature, or step in one example is contemplated to be used in place of or in addition to any structure, feature, or step of any other example. No features, structure, or step disclosed herein is essential or indispensable.

Conveyor systems generally include a track and a conveyor movable along the track. In some embodiments, the conveyor comprises a belt or a chain. The shape, pathway, and/or direction of the track can vary depending on available floor space or desired processes to be performed on the products, and the desired end location for the products being conveyed. For example, the track can include both straight sections and curved sections. In some embodiments, the conveyor is capable of running in both straight sections and in curved sections by flexing laterally when necessary to follow curves. Such conveyors can be called "side-flexing conveyors."

Some side-flexing conveyors have low conveyor strength and are prone to wear out more quickly than conveyors that are configured for running on straight tracks only. These problems can be exacerbated when the conveyor is asked to travel through tighter curves (e.g., the problems can increase as the turning radius of the track decreases). Accordingly, in some embodiments, it can be desirable to increase the strength of the conveyor at least when the conveyor flexes. In certain implementations, it can be desirable to reduce the total amount of material that makes-up the conveyor and/or reduce the weight of the conveyor. This can reduce the cost to manufacture the conveyor and the amount of energy required to move the conveyor.

FIGS. 1-4 illustrate an embodiment of a side-flexing conveyor 2. The side-flexing conveyor 2 can include one or more modules 6 connected together by rods 8. Each rod 8 joins at least two module rows 4, thereby to increasing the length of the conveyor 2 in the direction of travel. Each module row 4 can include one or more modules 6, depending on the desired lateral width of the conveyor 2. The modules 6 in the row 4 can be the same or different, such as in size, shape, or otherwise. For example, depending on the position of an individual one of the modules 6 relative to the other modules 6 in the row 4, the individual module can be the same as one or more of the other modules 6 and/or can be can be different from one or more of the other modules 6. In various embodiments, the rod 8 can be secured to at least one of the modules 6. Some mechanisms for securing the rod 8 to the module 6 are described in U.S. Pat. No. 7,699,160, filed Jan. 23, 2009, and U.S. Application Publication No. 2009/0308716, filed Jun. 11, 2008, each of which are hereby incorporated by reference herein in their entirety.

Figure 2:
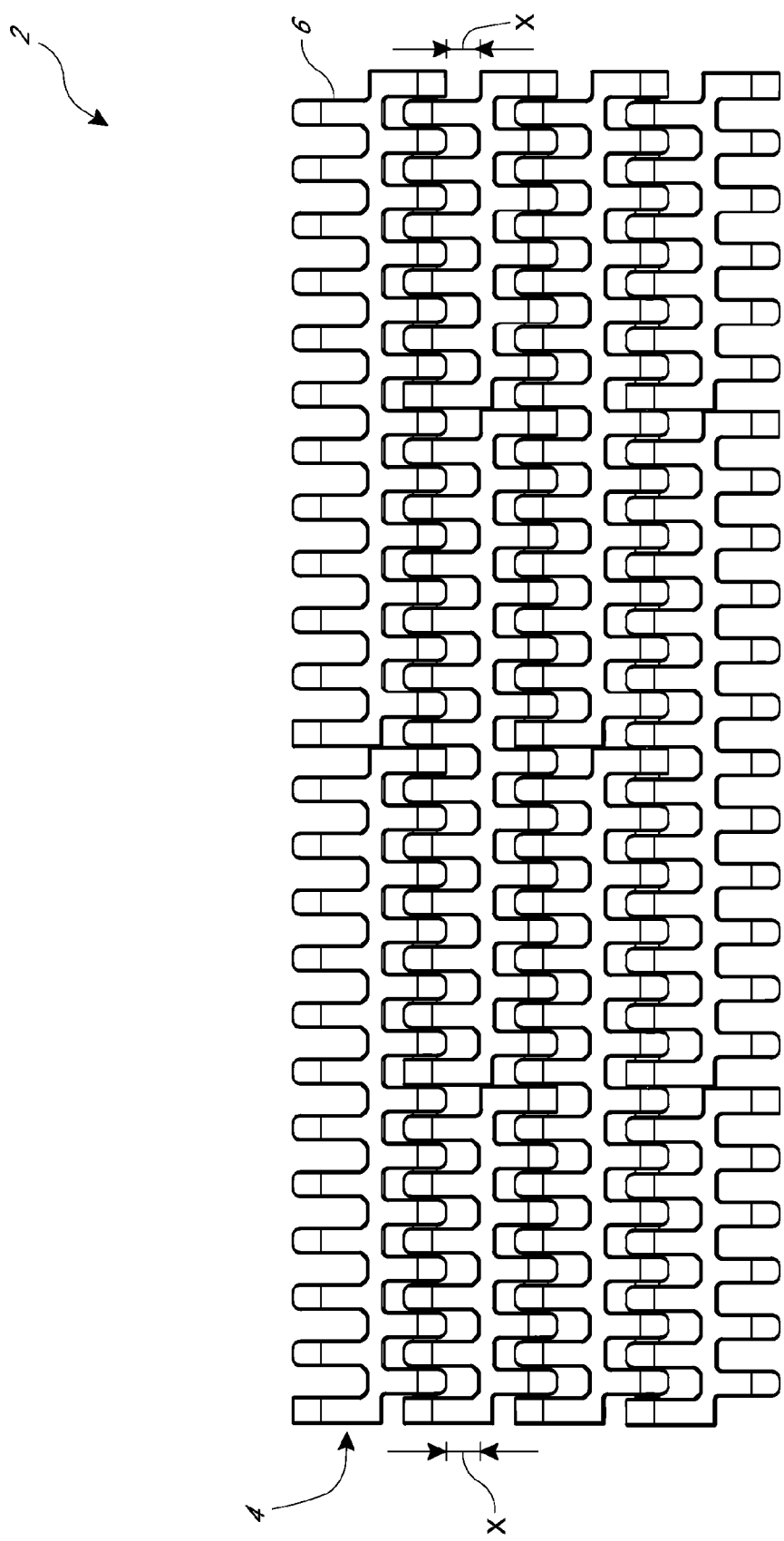
FIG. 2 illustrates a plan view of the portion of the side-flexing conveyor shown in FIG. 1.

FIGS. 1 and 2 illustrate a plurality of module rows 4 in a straight configuration. When the conveyor 2 is in the straight configuration, the module rows 4 are separated by essentially the same distance x on both lateral sides. The distance between a first end of a first module row and a first end of a second module row is substantially the same as a distance between a second end of the first module row and a second end of the second module row. As the conveyor 2 moves through a straight track section, the stress is generally evenly distributed along the width of the module row 4. Each link in the module row 4 can carry generally the same load, irrespective of the conveyor width.

Figure 3:
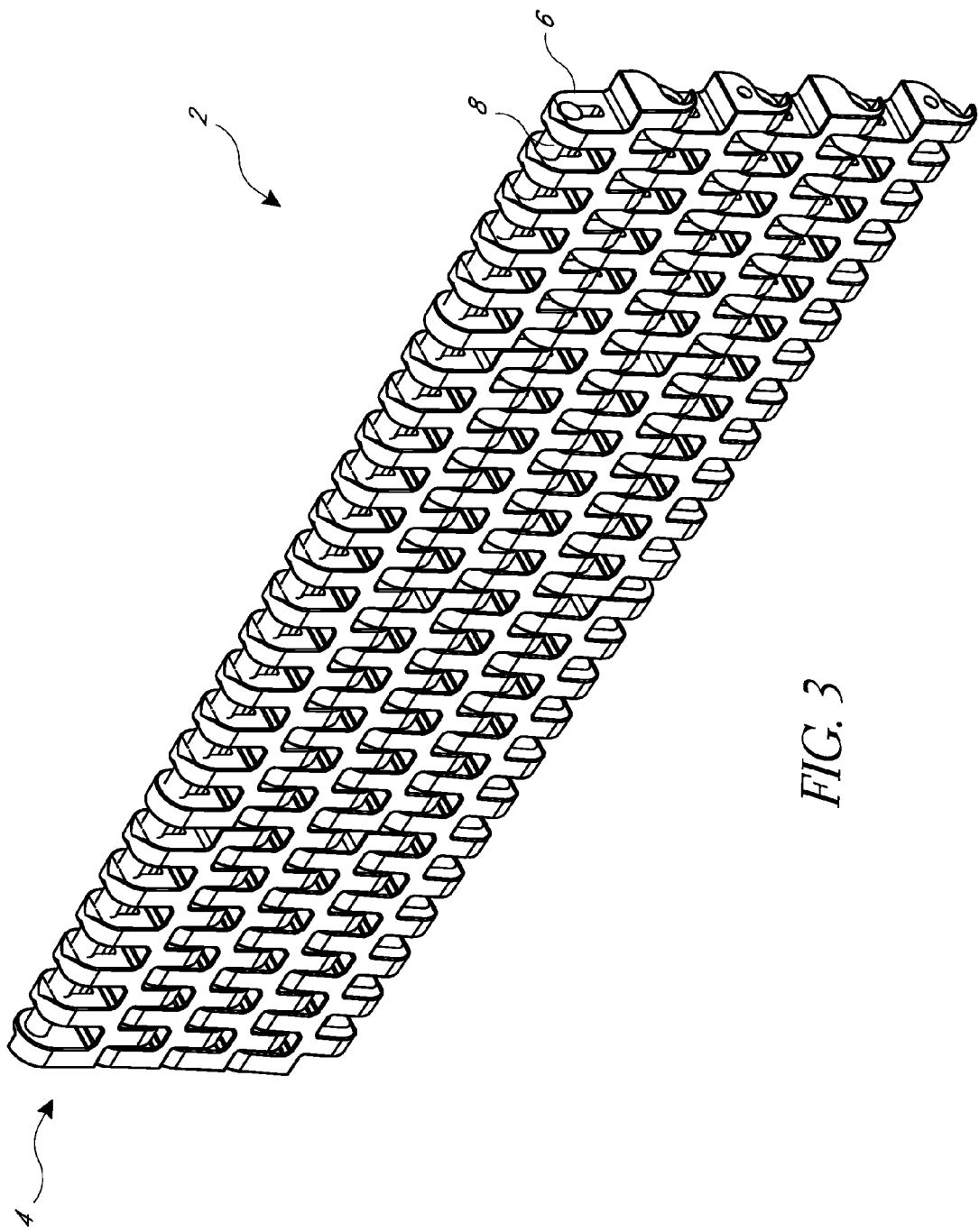
FIG. 3 illustrates a perspective view of the portion of the side-flexing conveyor in a flexed configuration.
Figure 4:
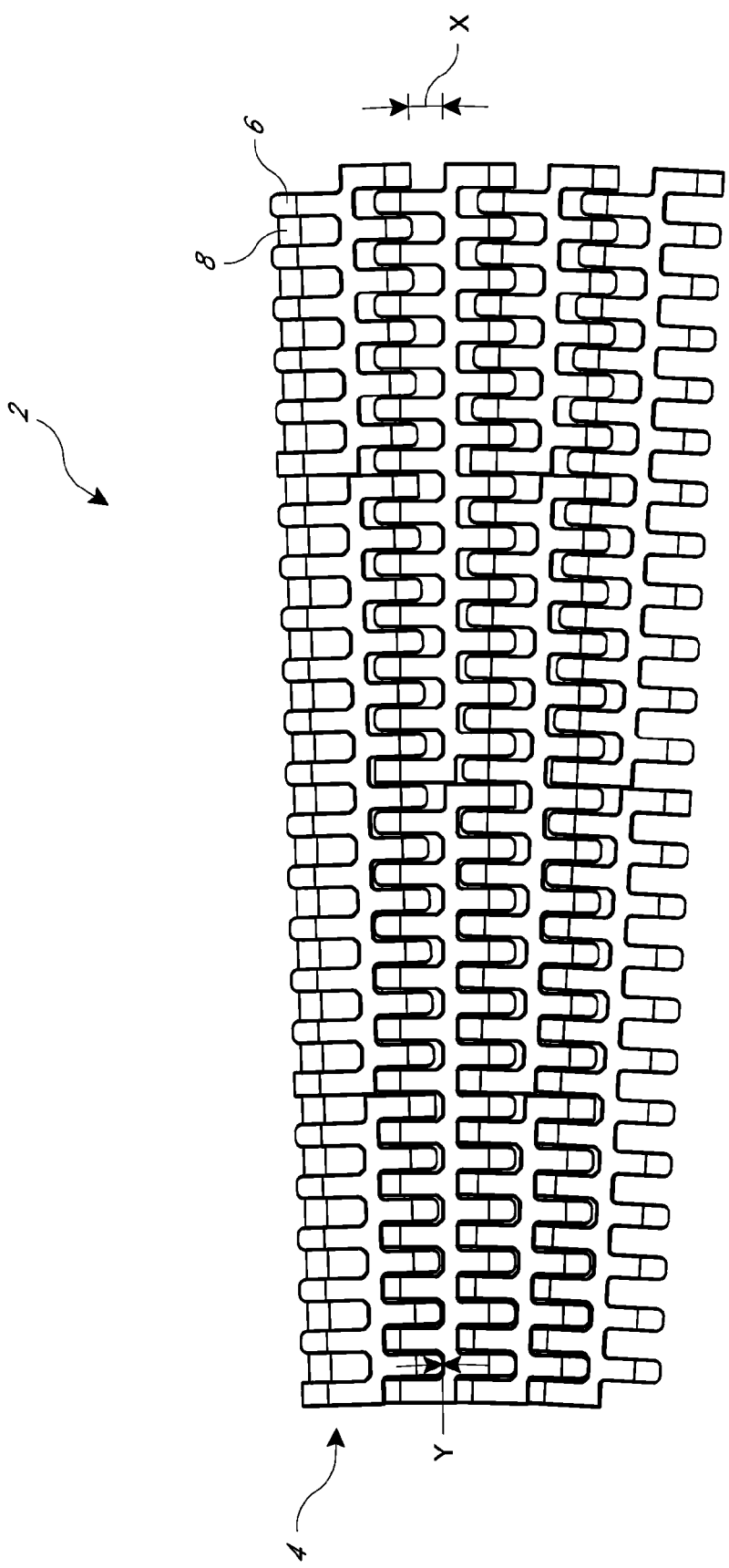
FIG. 4 illustrates a plan view of the portion of the side-flexing conveyor shown in FIG. 3.

FIGS. 3 and 4 illustrate the plurality of modules 6 in a flexed configuration such that the conveyor can be turned so as to convey products along a curvilinear or non-straight path. As the conveyor 2 flexes, the distance x between the first end of the first module row and the first end of the second module row differs from the distance y between the second end of the first module row and the second end of the second module row. As illustrated, during flexing, a plurality of consecutive rows is longer in the direction of travel on one lateral side than on the other lateral side. The lateral side with the shorter length along an edge of a collection of rows is generally the side on which lateral flexing of the conveyor occurs. For example, in the illustrated embodiment of FIG. 4, the distance along the collective of left edges of four consecutive modules is less than the distance along the collective right edges of the modules, and therefore the conveyor is flexing left. When the conveyor 2 flexes, the carry load is not generally uniform across the width of the conveyor and generally shifts laterally toward the region of the conveyor that has greater separation between module rows in the direction of travel (e.g., the lateral side that is generally opposite from the direction of flexing), irrespective of conveyor width.

In some embodiments, the radius of maximum curvature of side-flexing belts can be about or the same size as the belt width. In some embodiments, the radius of maximum curvature can be larger than the belt width. In some embodiments, the radius of maximum curvature can be at least about the same size of the belt width and/or less than or equal to about three times the belt width. In some embodiments, the radius of maximum curvature can be at least about the same size of the belt width and/or less than or equal to about two times the belt width. In some embodiments, the radius of maximum curvature can be at least about the same size of the belt width and/or less than or equal to about 1.5 times the belt width. In some embodiments, the radius of maximum curvature can be at least about 1.5 times the belt width and/or less than or equal to about 2.5 times the belt width. In some embodiments, the radius of maximum curvature can be at least about 1.8 times the belt width and/or less than or equal to about 2.2 times the belt width.

Figure 5:
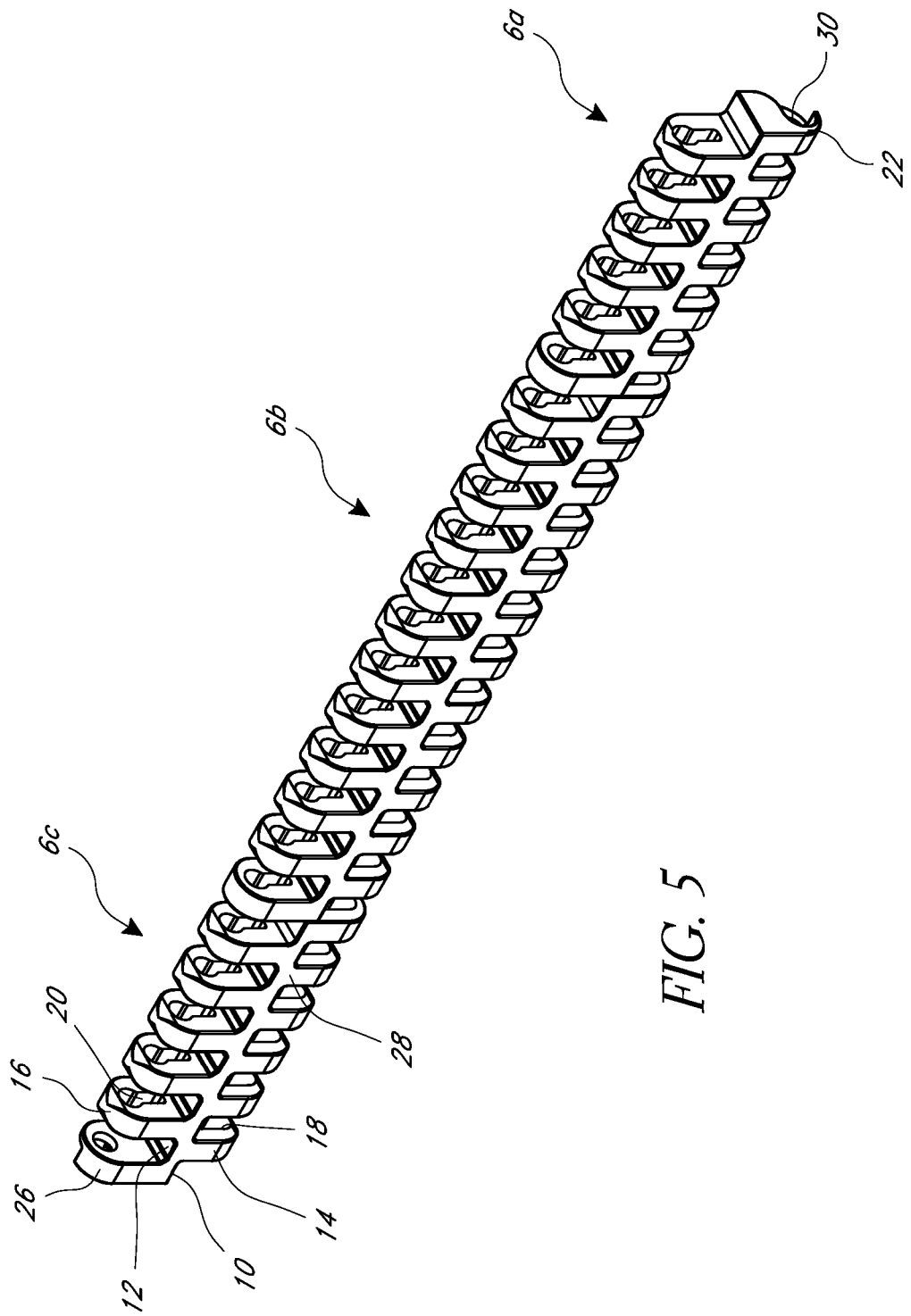
FIG. 5 illustrates a perspective view of a module row of the side-flexing conveyor shown in FIGS. 1-4.
Figure 6:
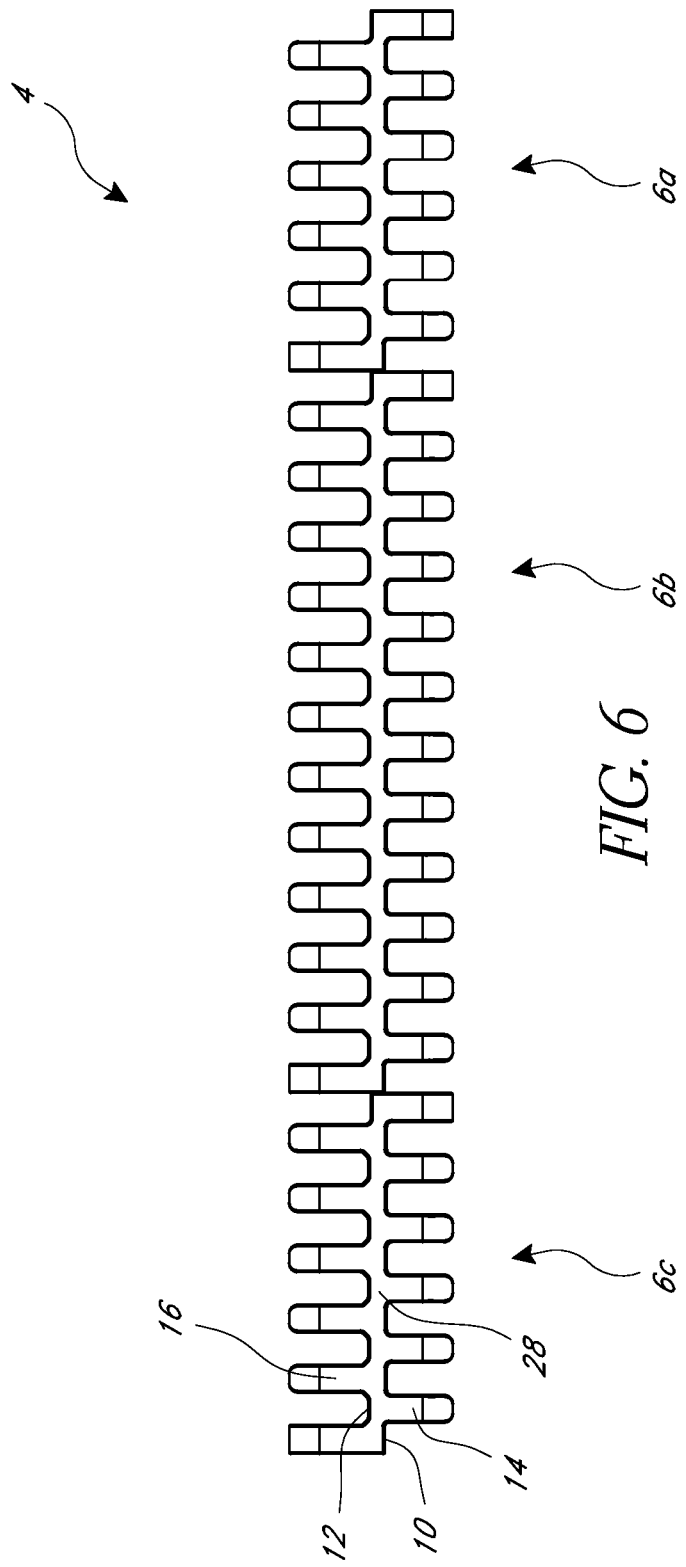
FIG. 6 illustrates a plan view of the module row shown in FIG. 5.

FIGS. 5 and 6 illustrate the module row 4. As previously noted, the modules 6 can be connected together by a rod (see FIGS. 1-4) extending through the module apertures. In some embodiments, the module row 4 includes a plurality of the modules 6. For example, the illustrated module row 4 includes a first module 6a, second module 6b, and third module 6c. As shown, the row 4 includes one of each of the first, second, and third modules 6a, 6b, 6c. However, the module rows 4 can include any number and combination of modules 6a, 6b, 6c. For example, the row 4 can include a plurality of any or all of the modules 6a, 6b, 6c. In some embodiments, the row 4 includes one or more of only the first and second modules 6a, 6b; only the first and third modules 6a, 6b; or only the second and third modules 6b, 6c. In some embodiments, each row 4 includes only the first module 6a, only the second module 6b, or only the third module 6c.

The modules 6a, 6b, 6c can each have a variety of lateral widths. For example, the first module 6a can have a lateral width of at least about: 3 inches, 4 inches, 5 inches, 6 inches, 7 inches, 8 inches, 9 inches, 10 inches, 11 inches, 12 inches, 13 inches, 14 inches, 15 inches, values between the aforementioned values, and otherwise. The second and/or third module 6b, 6c can each have a lateral width of at least about: 3 inches, 4 inches, 5 inches, 6 inches, 7 inches, 8 inches, 9 inches, 10 inches, 11 inches, 12 inches, 13 inches, 14 inches, 15 inches, values between the aforementioned values, and otherwise. In some embodiments, the first module 6a has a lateral width of at least about 6 inches and the second and third modules 6b, 6c each individually have a lateral width of at least about 3 inches. In certain variants, the first module 6a has a lateral width of at least about 9 inches and the second and third modules 6b, 6c each individually have a lateral width of at least about 4 inches. In some embodiments, the first module 6a has a lateral width of at least about 12 inches and the second and third modules 6b, 6c each individually have a lateral width of at least about 6 inches. In some implementations, the lateral width of the first module 6a is greater than or equal to the length of each of the second and third modules 6b, 6c. In certain variants, the lateral width of the first module 6a is greater than or equal to the combined length of the second and third modules 6b, 6c. In some embodiments, the lateral width of the first module 6a is less than or equal to the combined length of the second and third modules 6b, 6c. In some embodiments, the lateral width of each of the modules 6a, 6b, 6c is about equal.

In various implementations, the lateral width of each of the modules 6a, 6b, 6c—as well as the arrangements and combination of the modules 6a, 6b, 6c—can be adjusted to achieve a variety of row widths. For example, to achieve a row width of 15 about inches, some embodiments of the row 4 include two 6 inch long versions of the first module 6a and one 3 inch long version of the second module 6b. In certain embodiments, to achieve a row width of 15 about inches, the row 4 can include one 6 inch long version of the first module 6a, two 3 inch long versions of the second module 6b, and one 3 inch long version of the third module 6c. Further embodiments can achieve a row width of 15 about inches with a combination of two 3 inch long versions of the second module 6b, and three 3 inch long versions of the third module 6c. Of course, the aforementioned module and row sizes are for purposes of illustration only and are not intended to be limiting.

Modules 6 of differing lateral widths can be staggered to improve the strength of the conveyor 2. For example, as shown in FIGS. 1-4, a first module row and a third module row can include a first number of modules 6, and a second module row and a fourth module row can include a second number of modules 6. In addition, the widths of each module 6 in the first and third module rows can differ from the widths of each module 6 in the second and fourth module rows. As illustrated, the region or regions where two or more modules 6 abut laterally along a row can be different in consecutive rows.

The modules 6 can include a metal material, such as carbon steel or stainless steel. In some embodiments, the module may comprise a polymer, such a thermoplastic polymer (e.g., UHMW polyethylene). The module can include more than one type of material. For example, the module can include a stronger material in areas of the module that carry a greater load.

Figure 7A:
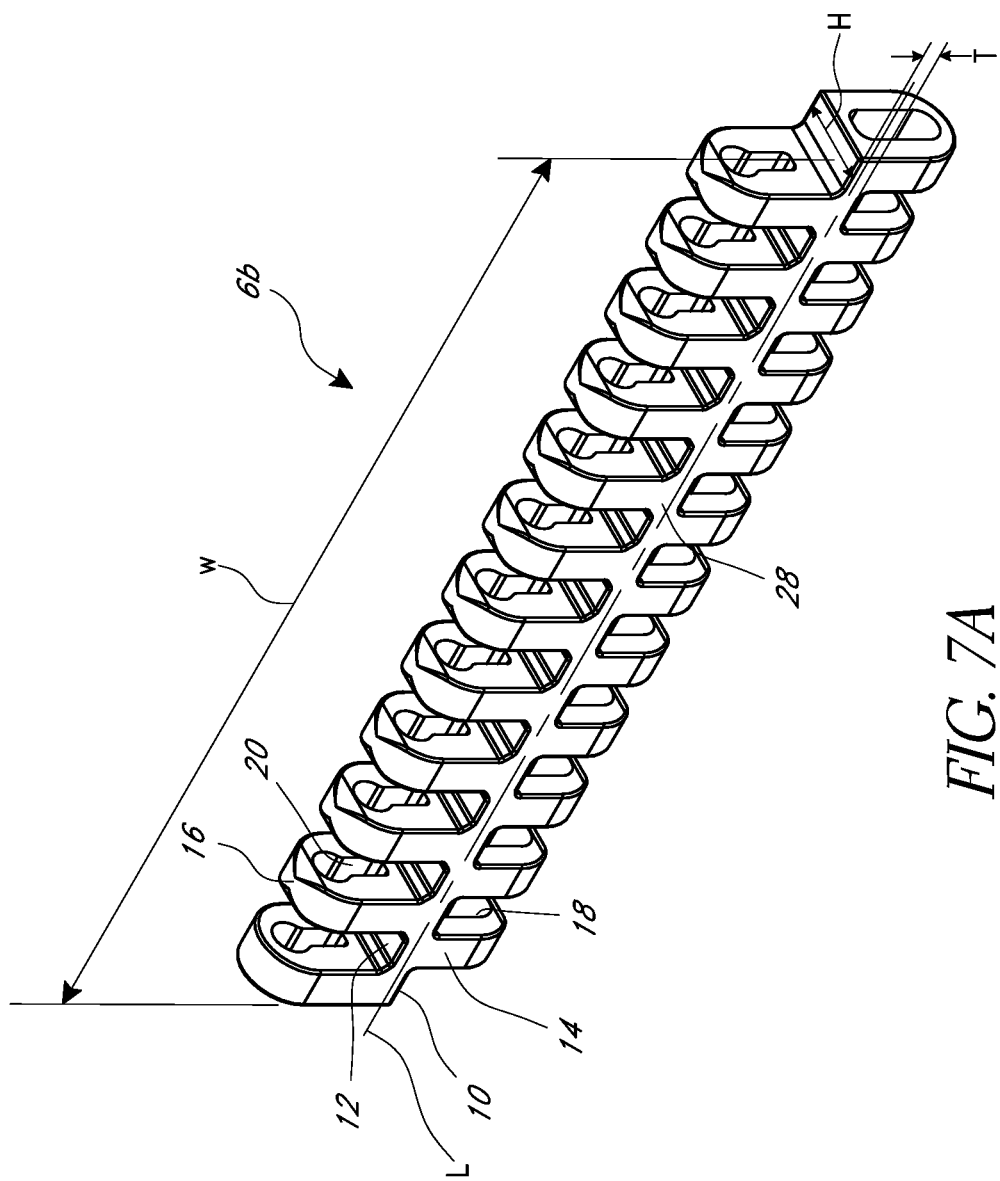
FIG. 7A illustrates a perspective view of a first module of the module row shown in FIG. 5.
Figure 7C:
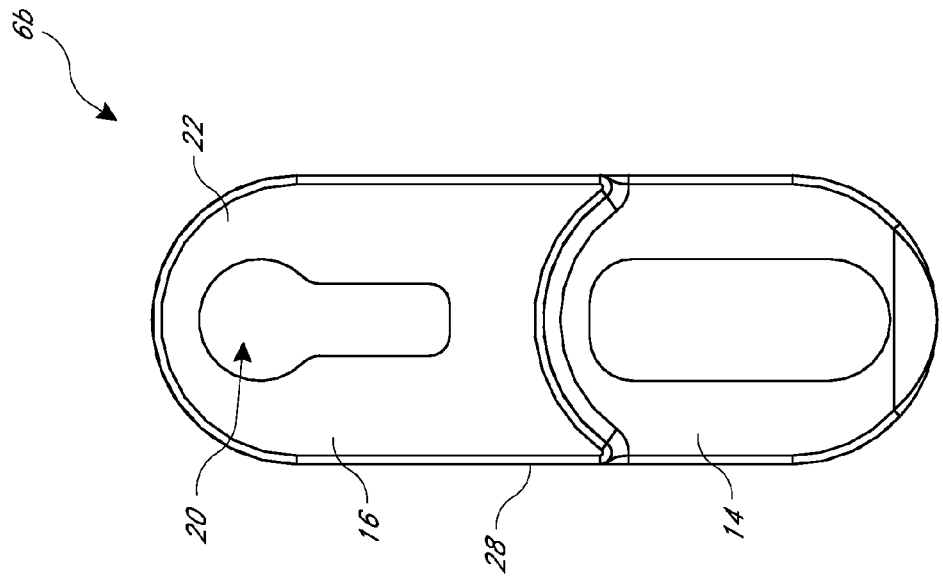
FIG. 7C illustrates another end of the first module shown in FIG. 7A.
Figure 7B:
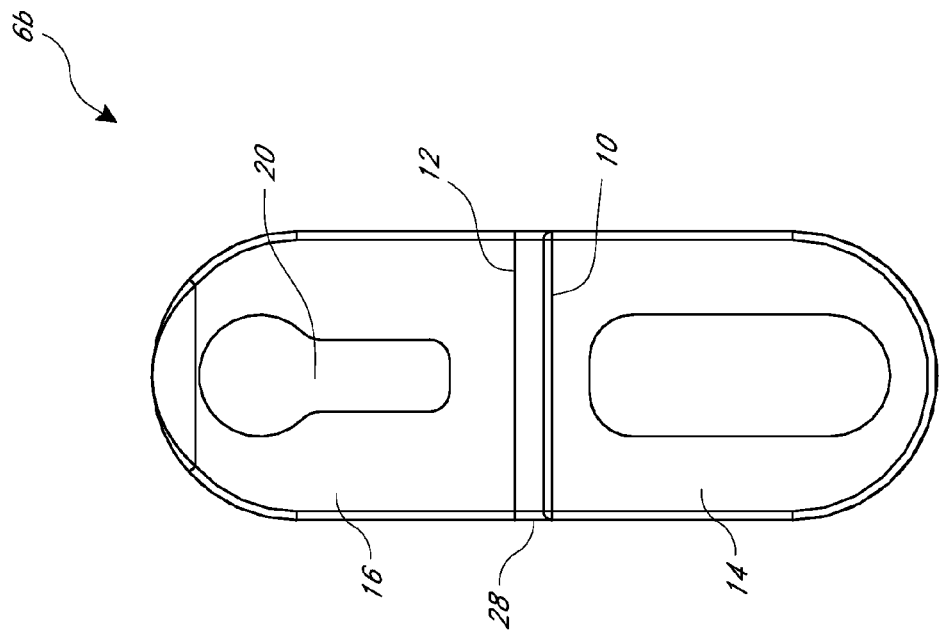
FIG. 7B illustrates an end of the first module shown in FIG. 7A.

FIGS. 7A-C illustrate different views of the first module 6a. FIG. 7B illustrates a first end of the first module 6a shown in FIG. 7A, while FIG. 7C illustrates a second end of the first module 6a shown in FIG. 7A. The module 6a includes a central portion 28 (also called a spine) and one or more front links 16 and rear links 14 extending from the central portion 28. The module 6a also includes front gaps between the front links 16 and rear gaps between the rear links 14. The gaps have generally the same shape as the links (e.g., the width of a gap is generally about the same size as the width of a link, and the length of a gap is generally about the same size as the length of a link), such that links in adjacent rows are configured to essentially completely fill gaps in adjacent rows when consecutive module rows are pushed together or compressed along the direction of travel. This close correspondence between links and gaps provides high surface area on the conveyor for contacting and supporting conveyed items, and diminishes the risk that conveyed items will catch or snag on edges or in overly wide open regions within the gaps or between rows.

The front links 16 and gaps can be staggered with the rear links 14 and gaps. This staggered configuration permits a first module row to interlink with the links on an opposing side of a second module row as shown in FIGS. 1-4.

The first module 6a includes a top load-bearing surface on which conveyed products typically rest, and a bottom surface facing the support surface (e.g., a track). A height of the module 6a extends from the top surface to the bottom surface. The module 6a has a front region or edge on the side of the module in the direction of conveyor travel and a rear region or edge on the side of the module in the direction facing away from the direction of conveyor travel. A thickness of the module 6a extends from the front edge to the rear edge. The module 6a also has a width (also called a length) extending from a first lateral edge of the module to a second lateral edge of the module.

The height of the first module 6a can be generally constant or uniform along at least a majority of the length of the module 6a. In some embodiments, such constant or uniform height is accomplished by providing nearly all or at least a majority of the surface area of the top region in the same plane and nearly all or at least a majority of the surface area of the bottom region in the same plane, without substantial protruding supports, struts, or connectors, or other structures, extending below or above such planes. In some embodiments, such constant or uniform height can occur along substantially the entire length of the module 6a, nearly the entire length of the module 6a, or the entire length of the module 6a. The height of the module 6a can be generally constant and uniform along at least a majority of the width of the module 6a, or along substantially the entire width of the module 6b, nearly the entire width of the module 6a, or the entire width of the module 6a. The maximum length of the module 6a can be generally constant or uniform along at least a majority of the width of the module 6a. For example, in a repeating section of a module comprising two forwardly directed links with a gap between them and two rearwardly directed links with a gap between them, the distance from an imaginary line along the front edge of the front links to an imaginary line along the rear edge of the rear links is generally uniform or constant along the width of a row of modules or along a majority of the width of a row of modules.

In some embodiments, the central portion 28 is configured to be generally orthogonal to a direction of conveyor travel when the conveyor is not flexing. The central portion 28 includes a top load-bearing surface and a bottom surface facing the support surface (e.g., a track). A height H of the central portion 28 extends from the top surface to the bottom surface. The central portion 28 has a front side 12 facing the direction of conveyor travel and a rear side 10 facing away from the direction of conveyor travel. A thickness T of the central portion 28 extends from the front side 12 to the rear side 10. The central portion 28 also has a width W (also called a length) extending from a first lateral edge of the module to a second lateral edge of the module. In some embodiments, the width W of the central portion 28 is less than or equal to the width of the module 6a.

The top and bottom surfaces of the central portion 28 can each have a generally uniform, constant length. The length can be generally uniform and constant along at least a majority of the width of the central portion 28. The length can be generally uniform and constant along substantially the entire width of the central portion 28, nearly the entire width of the central portion 28, or the entire width of the central portion 28.

The height H of the central portion 28 can be generally uniform (e.g., constant). For example, the height H can be generally uniform and constant along at least a majority of the width of the central portion 28. The height H can be generally uniform and constant along substantially the entire width of the central portion 28, nearly the entire width of the central portion 28, or the entire width of the central portion 28. The height H can be generally uniform and constant along at least a majority of the thickness T of the central portion 28. The height H can be generally uniform and constant along substantially the entire thickness T of the central portion 28, nearly the entire thickness T of the central portion 28, or the entire thickness T of the central portion 28.

As noted above, the thickness T can extend between the front side 12 to the rear side 10. In some embodiments, the top and/or bottom surfaces of the central portion 28 can include a generally uniform (e.g., constant) thickness. For example, the thickness T at or near the top and/or bottom surfaces of the central portion 28 can be generally uniform along at least a majority of the length of the central portion 28. The thickness T can be generally uniform along substantially the entire length of the central portion 28, nearly the entire length of the central portion 28, or the entire length of the central portion 28. The thickness T can be generally uniform and constant along at least a majority of the height H of the central portion 28. The thickness T can be generally uniform along substantially the entire height H of the central portion 28, nearly the entire height H of the central portion 28, or the entire height H of the central portion 28.

In various embodiments, the central portion 28 includes a main region that extends in a straight, non-tortuous path. This can increase rigidity along the width of the conveyor, which can increase the strength of the conveyor as the conveyor flexes and/or can reduce deformation of the conveyor during operation. In certain implementations, the central portion 28 is continuous (e.g., uninterrupted) along substantially the entire or the entire length of the module 6a. The central portion 28 can include a straight portion that extends from the first lateral edge to the second lateral edge. For example, as shown in FIG. 7A, the continuous straight portion can extend along a line L drawn between a first point within the thickness T of the spine at the first lateral edge and a second point within the thickness T of the spine at the second lateral edge. The straight, non-tortuous region can extend along at least a majority of the width of the central portion 28. The straight, non-tortuous region can extend along substantially the entire width of the central portion 28, nearly the entire width of the central portion 28, or along the entire width of the central portion 28.

In certain embodiments, the central portion 28 has a substantially rectangular peripheral shape when viewed from the top, as can be seen in FIG. 6. As illustrated, the links 14, 16 can connect with the rectangular peripheral shape central portion 28. Angled or chamfered portions can provide additional securement at the connection between the central portion 28 and the links 14, 16. In some implementations, the central portion 28 has a non-corrugated shape when viewed from the top.

In some variants, the central portion 28 is free of grooves or holes, such as generally vertically extending openings. In some embodiments, all portions of the front edge of the central portion are in front of the rear edge of the central portion. For example, in some embodiments, as illustrated, the rear portion of each front gap forms a leading front edge of at least a portion of the central portion, and the front portion of each rear gap forms a trailing edge of at least a portion of the central portion 28, and each rear portion of each front gap is positioned in front of each front portion of each rear gap.

The top surface of the central portion 28 can include a region that is generally flat or planar. The flat, planar region can extend along at least a majority of the width of the central portion 28. The flat, planar region can extend along substantially the entire width of the central portion 28, nearly the entire width of the central portion 28, or along the entire width of the central portion 28. Similarly, the bottom surface can include a region that is flat and planar along at least a majority of the width of the central portion 28. The flat load bearing surface can be desirable because it provides a flat surface to convey products and can be easier to clean and may be less likely to accumulate debris.

At least one of the front side 12 of the central portion 28 or the rear side 12 of the central portion 28 can include a generally concave region. For example, as shown in FIGS. 7B and 7C, the front side 12 of the central portion 28 can be planar, while the rear side 10 of the central portion 28 can be concave.

The concave face allows the first module 6a to move further toward an adjacent module row 4 when the conveyor flexes, which assists in providing a low turning radius for the conveyor. The concave face also diminishes the total amount of material required to manufacture the conveyor and therefore reduced the cost of the conveyor.

In some embodiments, at least a portion of the central portion 28 can be generally dome-shaped. For example, at least one of the front side 12 of the central portion 28 or the rear side 12 of the central portion 28 can be generally concave, while the other side can be generally convex. In certain variants, the front side 12 of the central portion 28 can be generally planar, while the rear side 10 of the central portion 28 can be generally convex. The generally dome-shaped central portion 28 can decrease the turning radius of the conveyor 2 and improve the rigidity of the central portion 28. This improved rigidity can aid in maintaining the strength of the conveyor 2 when the conveyor flexes. The convex face of the central portion 128 also can reduce the open area between adjacent row modules 4.

In some embodiments, the first module 6a includes a plurality of rear links 14 extending from the rear side 10 of the central portion 28 and a plurality of front links 16 extending from the front side 12 of the central portion 28. The front links 16 and the rear links 14 can be integrally formed with the central portion 28. The first module 6a also includes a rear gap between any two adjacent rear links 14 and a front gap between any two adjacent front links 16. The plurality of links can be at least about: two links, three links, six links, twelve links, or any other number of links.

As shown in FIG. 7A, the front links 16 and the rear links 14 can extend in a direction generally perpendicular to the central axis of the central portion 28 extending along the width of the central portion 28. The front links 16 and the rear links 14 can extend in a direction generally perpendicular to the straight, non-tortuous region of the central portion 28. The front links 16 can be staggered from the rear links 14.

The front links 16 and the rear links 14 can include a top load-bearing surface and a bottom surface facing the track. A height of the links extends from the top surface to the bottom surface. The front links 16 have a front edge facing the direction of conveyor travel and the rear links 14 have a rear edge facing away from the direction of conveyor travel. A length of the front link 16 extends from a front side 12 of the central portion 28 to the front edge of the front link 16. A length of the rear link 14 extends from a rear side 10 of the central portion 28 to the rear edge of the rear link 14.

The links have a width extending from a first lateral edge of the link to a second lateral edge of the link. In various embodiments, the links have a generally constant width. In some embodiments, the links each have a connection end that connects with the central portion 28 and an opposite end (e.g., a free end). In certain implementations, the width of a given link at the opposite end is less than or equal to the width of that link at the connection end. In some embodiments, the links do not include a bulbous head portion at the opposite end.

The top surface of the front links 16 and the rear links 16 can include a region that is generally flat and generally planar. The generally flat, planar region can extend along at least a majority of the length of the front links 16 or rear links 14. The generally flat, planar region can extend along substantially the entire length of the links, nearly the entire length of the links, or along the entire length of the links. Similarly, the bottom surface can include a region that is generally flat and planar along at least a majority of the length of the front links 16 and rear links 14. The generally flat load-bearing surface can be desirable because it provides a flat surface to convey products and can be easier to clean, and less likely to accumulate debris.

The rear end portion of at least one of the rear links 14 can be generally tapered along the first lateral surface of the rear link 14 and/or the second lateral surface of the rear link 14. The generally tapered surface can be generally rounded or generally planar. As shown in FIG. 7A, the generally tapered lateral surfaces of the rear links 14 are generally planar. At least a majority of the rear links 14 can include a tapered rear end portion. The at least a majority of the rear links 14 can be substantially all of the rear links 14, nearly all of the rear links 14, or all of the rear links 14. As the conveyor flexes, the tapered rear end portions can move further toward the adjacent module row 4 and decrease the turning radius of the conveyor. The tapered rear end portions also reduce friction between the module rows 4.

The length of each rear link 14 can be substantially the same along at least a majority of the width of the rear link 14. The length of the rear link 14 can be substantially the same along substantially the entire width of the rear link 14, along nearly the entire width of the rear link 14, or along the entire width of the rear link 14.

The length of each rear link 14 can be greater than the length of the central portion 28. The length of each rear link 14 can be greater than the length of the central portion 28 along at least a majority of the width of the rear link 14, along substantially the entire width of the rear link 14, along nearly the entire width of the rear link 14, or along the entire width of the rear link 14.

The height of the rear links 14 can be substantially the same along at least a majority of the width of the rear link 14. The length of the rear links 14 can be substantially the same along substantially the entire width of the rear link 14, nearly the entire width of the rear link 14, or the entire width of the rear link 14.

In some embodiments, the width of each rear link 14 can be substantially the same along at least a majority of the length of the rear link 14. The width of the rear links 14 can be the substantially the same along substantially the entire length of the rear link 14, nearly the entire length of the rear link 14, or the entire length of the rear link 14.

The rear end portion of at least one of the rear links 14 can be generally tapered along a top surface of the rear link 14 and/or a bottom surface of the rear link 14. The generally tapered surface can be rounded or planar. As shown in FIG. 7A, the generally tapered top and bottom surfaces of the rear links 14 are generally rounded. The rear links 14 can include a generally tapered rear end portion along at least a majority of the rear links 14, along nearly all of the rear links 14, or along all of the rear links 14. The tapered rear end portions reduce friction between the module rows 4.

The length of each rear link 14 can be substantially the same along at least a majority of the height of the rear link 14. The length of the rear links 14 can be substantially the same along substantially the entire height of the rear link 14, nearly the entire height of the rear link 14, or the entire height of the rear link 14.

The height of each rear link 14 can be substantially the same along at least a majority of the length of the rear link 14. The height of the rear link 14 can be substantially the same along substantially the entire length of the rear link 14, nearly the entire length of the rear link 14, or the entire length of the rear link 14.

In some embodiments, at least a majority of the rear links 14 have substantially the same shape and/or size. In some embodiments, all of the rear links 14, substantially all of the rear links 14, or nearly all of the rear links 14, can have substantially the same shape and/or size. The height of at least a majority of the rear links 14 of the module 6a can be generally the same. In some embodiments, the height of substantially all of the rear links 14, nearly all of the rear links 14, or all of the rear links 14, can be generally the same.

Each rear link 14 can include an aperture 18. The rear link aperture 18 is shaped and sized to permit the rear link 14 to move relative to the rod 8. For example, the rear link aperture 18 can be an elongated aperture. The rear link aperture 18 can include a length extending along the direction of conveyor travel when not flexing. The length of the rear link aperture 18 can be substantially greater than a height of the rear link aperture 18.

In some embodiments, the first module 6a can include a rear gap between any two rear links 14. The rear gap includes a front edge along the rear edge of the central portion 28 and shares a lateral edge with each of the two adjacent rear links. The front edge of the gap can be generally perpendicular to the lateral edges of the gap, as illustrated. The lateral edges of the rear gap can be longer than the front edge of the rear gap.

The rear gap includes a front side along the rear side 10 of the central portion 28 and shares a lateral side with each of the two adjacent rear links 14. The length of the rear gap extends from the front side of the rear gap to the rear side of the first module 6a. The width of the rear gap extends from a first lateral side of the rear gap to a second lateral side of the rear gap. The width of the rear gap can substantially the same or slightly larger than the width of the links. In some embodiments, as illustrated, the face of the front side of the gap can be generally perpendicular to the direction of travel of the conveyor and/or generally perpendicular to the lateral sides of the gap, without an overhanging surface suspended between the lateral sides of the gap.

For example, in some embodiments, the width of the rear gap can be substantially the same along at least a majority of the length of the rear gap, or along substantially the entire length of the rear gap, or along nearly the entire length of the rear gap, or along the entire length of the rear gap.

The length of the rear gap can be substantially the same along at least a majority of a width of the rear gap, or along the entire width of the rear gap, or along nearly the entire width of the rear gap, or along the entire width of the rear gap.

The length of the rear gap can be substantially the same along at least a majority of the height of the adjacent rear links. The length can be substantially the same along substantially the entire height, nearly the entire height, or the entire height of the adjacent rear links. In some embodiments, there is a plurality of front gaps between adjacent pairs of front links, and a plurality of rear gaps between adjacent pairs of rear links. The length of each front gap, from the front edge of the central portion to a front edge of the module, can be substantially the same along substantially the entire height of an adjacent front link, from a top surface of the module to a bottom surface of the module, and the length of each rear gap, from the rear edge of the central portion to a rear edge of the module, can be substantially the same along the entire height of an adjacent rear link, from the top surface of the module to the bottom surface of the module.

At least a majority of the rear gaps can have substantially the same shape and/or size. The proportion of rear gaps with substantially the same shape and/or size can be substantially all of the rear gaps, nearly all of the rear gaps, or all of the rear gaps. For example, the widths and/or lengths of at least a majority of the rear gaps of the first module 6a can be generally the same.

The front end portion of at least one of the front links 16 can be generally tapered along the first lateral surface of the front link 16 and/or the second lateral surface of the front link 16. The generally tapered surface can be rounded or planar. As shown in FIG. 7A, the generally tapered lateral surfaces of the front links 16 are planar. At least a majority of the front links 16 can include a generally tapered front end portion. In some embodiments, substantially all of the front links 16, nearly all of the front links 16, or all of the front links 16 can include a generally tapered front end portion. As the conveyor 2 flexes, the generally tapered front end portions can move further toward the adjacent module row 4 and decrease the turning radius of the conveyor. The generally tapered front end portions also reduce friction between the module rows 4.

The length of each front link 16 can be substantially the same along at least a majority of the width of the front link 16. The length of the front link 16 can be substantially the same along substantially the entire width of the front link 16, nearly the entire width of the front link 16, or the entire width of the front links 16.

The length of each front link 16 can be greater than the thickness of the central portion 28. The length of each front link 16 can be greater than the thickness of the central portion 28 along at least a majority of the width of the front link 16, along substantially the entire width of the front link 16, along nearly the entire width of the front link 16, or along the entire width of the front link 16.

The height of each front link 16 can be substantially the same along at least a majority of the width of the front link 16. The height of the front links 16 can be substantially the same along substantially the entire width of the front link 16, nearly the entire width of the front link 16, or the entire width of the front link 16.

A width of each front link 16 can be substantially the same along at least a majority of the length of the front link 16. The width of the front links 16 can be substantially the same along substantially the entire length of the front link 16, nearly the entire length of the front link 16, or the entire length of the front link 16.

The front end portion of at least one of the front links 16 can be generally tapered along a top surface of the front link 16 and/or a bottom surface of the front link 16. The generally tapered surface can be generally rounded or generally planar. As shown in FIG. 7A, the tapered top and bottom surfaces of the front links 16 are rounded. A generally tapered front end portion can be provided on at least a majority of the front links 16, on substantially all of the front links 16, on nearly all of the front links 16, or on all of the front links 16. The generally tapered front end portions reduce friction between the module rows 4.

The length of each front link 16 can be substantially the same along at least a majority of a height of the front link 16. The length of the front link 16 can be substantially the same along the entire height of the front link 16, nearly the entire height of the front link 16, or the entire height of the front link 16.

The height of each front link 16 can be substantially the same along at least a majority of the length of the front link 16. The height of the front link 16 can be substantially the same along the entire length of the front link 16, nearly the entire length of the front link 16, or the entire length of the front link 16.

In some embodiments, at least a majority of the front links 16 can have substantially the same shape and/or size. In some embodiments, substantially all of the front links 16, nearly all of the front links 16, or all of the front links 16 can have substantially the same shape and/or size. For example, the lengths of at least a majority of the front links 16 of the first module 6a can be generally the same. Substantially all of the front links 16, nearly all of the front links 16, or all of the front links 16 can have lengths that are generally the same. The widths of at least a majority of the front links 16 of the first module 6a can be the same. Substantially all of the front links 16, nearly all of the front links 16, or all of the front links 16 can have widths that are generally the same. The height of at least a majority of the front links 16 of the first module 6a can be generally the same. Substantially all of the front links 16, nearly all of the front links 16, or all of the front links 16 can have generally the same height.

Each front link 16 can include an aperture 20. As shown in FIG. 7A, the front link aperture 20 can comprise a portion that is generally rounded and a portion that is generally slotted. The front link aperture 20 can be shaped and sized in any manner to fix the front link 16 relative to the rod 8. The shape of the aperture 20 can assist in positioning the front link 16 relative to the rod 8, while minimizing the amount of module material. Fixing the front links 16 relative to the rod 8 can aid in controlling and/or directing the conveyor 2 as it flexes.

The first module 6a includes a front gap between any two front links 16. The front gap includes a rear edge along the front edge of the central portion 28 and shares a lateral edge with each of the two adjacent front links 16. The rear edges of the front gaps are generally perpendicular to the lateral edges of the front gaps. The lateral edges of the front gap can be longer than the rear edge of the front gap.

The front gap can include a rear side along the front side 12 of the central portion 28 and shares a lateral side with each of the two adjacent front links 16. The length of the front gap extends from the rear side of the front gap to the front side of the first module 6a. The width of the front gap extends from a first lateral side of the front gap to a second lateral side of the front gap. The width of the front gap can be substantially the same or slightly larger than the width of the links. In some embodiments, as illustrated, the face of the rear side 12 of the gap can be generally perpendicular to the direction of travel of the conveyor and/or generally perpendicular to the lateral sides of the gap, without an overhanging surface suspended between the lateral sides of the gap.

The width of the front gap can be generally the same along at least a majority of the length of the front gap. Substantially the entire length of the front gap, nearly the entire length of the front gap, or the entire length of the front gap, can have a width that is generally the same.

The length of the front gap can be the same along at least a majority of a width of the front gap. The at least a majority of the width can be substantially the entire width of the front gap, nearly the entire width of the front gap, or the entire width of the front gap.

The length of the front gap can be substantially the same along at least a majority of the height of the adjacent front links. The length of the front gap can be substantially same along substantially the entire height, nearly the entire height, or the entire height of the adjacent front links.

At least a majority of the front gaps can have substantially the same shape and size. Substantially all of the front gaps, nearly all of the front gaps, or all of the front gaps can have substantially the same shape and size. For example, the widths of at least a majority of the front gaps of the first module 6a can be the same. The at least a majority of the front gaps can be substantially all of the front gaps, nearly all of the front gaps, or all of the front gaps. The lengths of at least a majority of the front gaps of the first module 6a can be the same. The at least a majority of the front gaps can be substantially all of the front gaps, nearly all of the front gaps, or all of the front gaps. The height of at least a majority of the front gaps of the first module 6a can be generally the same. Substantially all of the front gaps, nearly all of the front gaps, or all of the front gaps, can have height that are generally the same.

At least a majority of the rear links 14 can have a length the same as the length of the front links 16. The at least a majority of the rear links 14 can be substantially all of rear links 14, nearly all of the rear links 14, or all of the rear links 14.

Figure 8A:
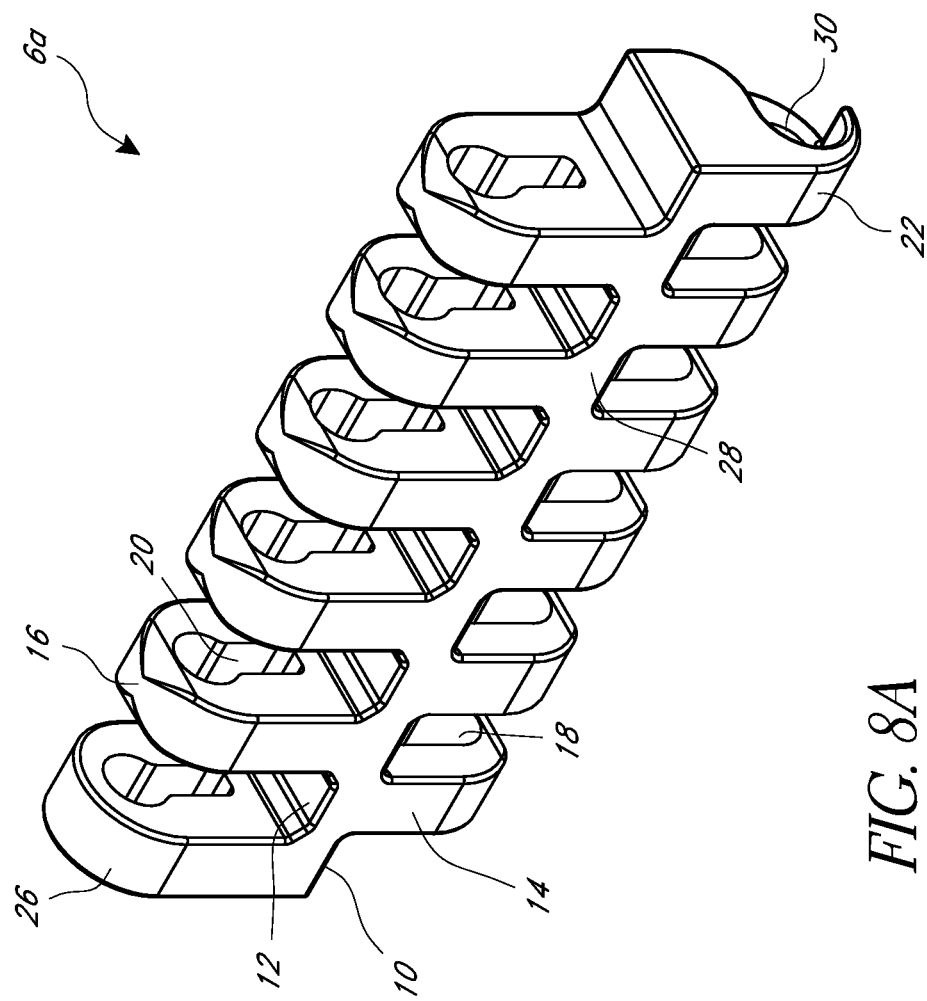
FIG. 8A illustrates a perspective view of a second module of the module row shown in FIG. 5.
Figure 8C:
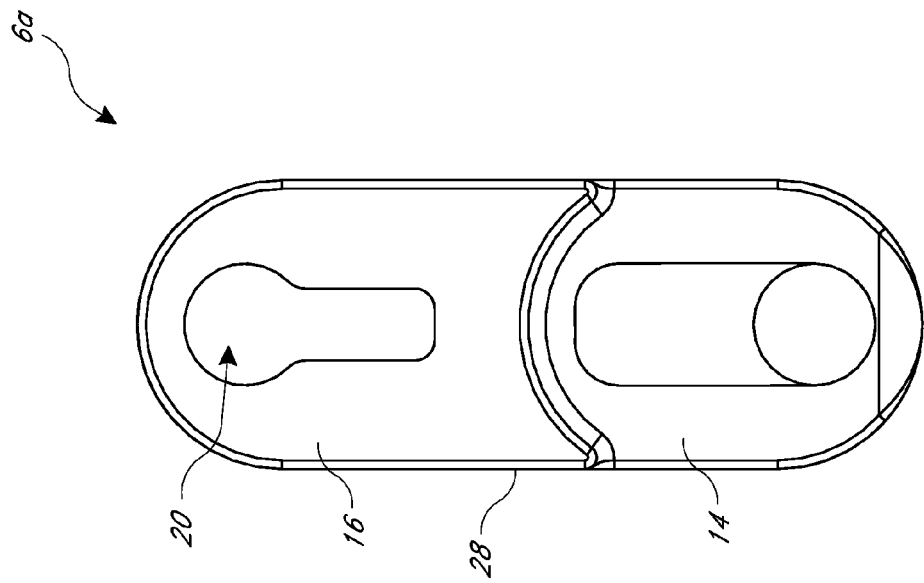
FIG. 8C illustrates another end of the second module shown in FIG. 8A.
Figure 8B:
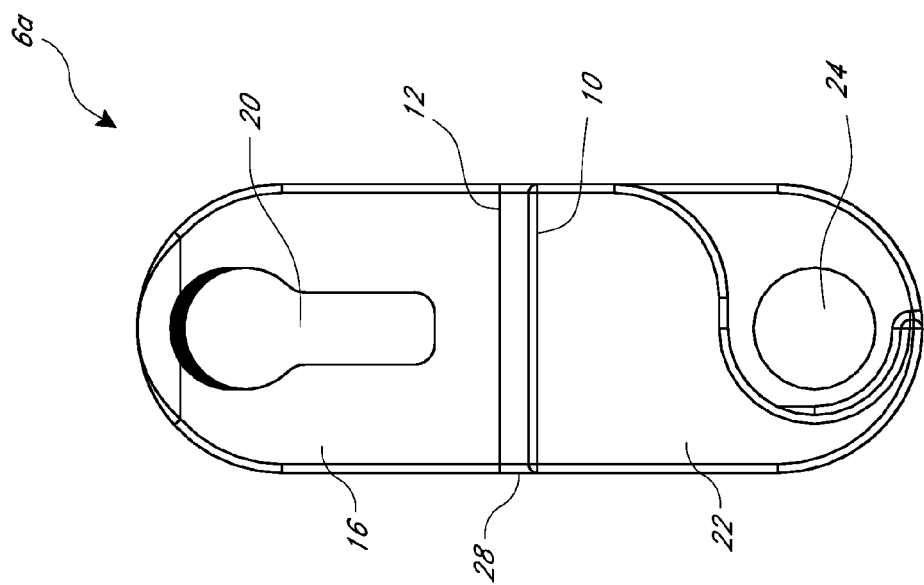
FIG. 8B illustrates an end of the second module shown in FIG. 8A.

FIGS. 8A-8C illustrate different views of the second module 6b. FIG. 8B illustrates a first end of the second module 6b, and FIG. 8C illustrates a second end of the second module 6b. The second module 6b can include any of the features described above in reference to the first module 6a.

The second module 6b can include a rod-securing rear link 22. The rod securing rear link 22 restricts axial movement of the rod. The rod (not shown) can include a flange portion that engages with an opening 30 in the rear link 22. As shown in FIG. 8B, the rod-securing rear link 22 can include a curved lateral surface. The rod can include a tab portion positioned adjacent to the curved lateral surface when the rod is connected to the second module 6b. Although the rear link apertures 16 generally permit movement of the second module 6b relative to the rod, the rod-securing rear link 22 can include an aperture 24 configured to fix the end of module 6b relative to the rod 8. For example, the aperture 24 can be round. The rod-securing rear link 22 can include a second aperture to permit uniform material cooling during molding. Further description of an example of a rod-securing rear link 22 can be found in U.S. Pat. No. 7,699,160 and U.S. Application Publication No. 2009/0308716, each of which are hereby incorporated by reference herein in their entirety.

Some or all of the front apertures 20 of any of the modules 6a, 6b, 6c can have varying widths to reduce the turning radius of the conveyor when the conveyor flexes. A length of a first front aperture can be longer than a length of a second front aperture, adjacent to the first elongated aperture. The length of the second front aperture can be longer than a length of a third front aperture, adjacent to the second front aperture. In some embodiments, the difference in length between the first elongated aperture and the second elongated aperture is about or exactly the same as the difference in length between the second elongated aperture and the third elongated aperture. This can result in bearing edges of some or all of the subset of front link apertures 20 forming a general linear progression. The bearing edges are the internal surfaces of the front link apertures 20 that contact (e.g., bear against) the rod during travel of the belt (e.g., in during straight travel of the belt).

In some embodiments, the general linear progression of the bearing edges can form an angle of less than or equal to about 1° relative to the bearing edge of the key-hole apertures not included in the linear progression. The angle can be less than or equal to about 0.5°, between about 0.25° and about 0.75°, or between about 0.5° and about 1°. Although the linear progression was discussed in reference to the front apertures 20, the rear apertures 18 can also differ in length to form a linear progression along the bearing edge of the rear apertures 18.

In some embodiments, at least two bearing edges together form a linear progression at an angle. The angle can be between a line that passes through the midpoints of each of the bearing edges and a line along the longitudinal centerline of the central region 28. In some implementations, the angle is less than or equal to about 1° relative to the longitudinal centerline of the central region 28. In certain embodiments, the linear progression of the bearing edges is at a constant slope from one lateral edge of the module 6a, 6b, 6c to the other lateral edge of the module. This can facilitate turning of the module 6a, 6b, 6c in a certain direction (e.g., to the right or to the left).

In some embodiments, the linear progression of the bearing edges is variable along the lateral width of the module 6a, 6b, 6c. For example, the linear progression of the bearing edges can have an inflection point at which the slope of the linear progression changes (e.g., from a positive slope to a negative slope) along the longitudinal centerline of the central region 28. The slope can extend from the inflection point in at a first angle toward one of the edges of the module and at a second angle toward a second edge of the module. This can facilitate turning of the module in multiple directions (e.g., to the right and to the left).

In some variants, a conveyor belt includes a central region, right edge region, and left edge region. The central region can include one or more of the modules 6a, 6b, 6c having a linear progression with an inflection point. The left and right edge regions can each include one or more of the modules 6a, 6b, 6c having a linear progression at a constant slope from one lateral edge of the module to the other lateral edge of the module. The right and left edge regions can have linear progressions at different slopes. For example, the slope of the linear progression in the right hand region can be positive and the slope of the linear progression in the left hand region can be negative. In certain embodiments, the slopes of the linear progressions in the right and left edge regions are mirror images of each other.

The thickness T of the central portion 28 can vary along the length of the second module 6b. For example, the thickness T of the central portion 28 can be narrower toward the rod-securing rear link 22. The narrow portion of the central portion 28 can reduce the turning radius by providing more room for the links of the adjacent module row 4 to move further. If the central portion 28 includes a generally convex face, the narrow portion of the central portion 28 can reduce interference between the generally convex face of the central portion 28 and the links of the adjacent module row 4. The central portion 28 can include generally convex-shaped indents, chamfers, or a combination of convex-shaped indents and chamfers between links. Symmetrical cuts can facilitate flexing of the conveyor in both directions.

The width of the front or rear gaps can vary along the length of the gaps, such that the width of a portion of the gap closer to the central portion 28 is wider than a portion of the gap closer to the edge of the second module 6b. The wider gap portion near the central portion 28 allows the second module 6b to move closer to the adjacent module row.

The length of one or more front links 16 can differ from the length of one or more rear links 14. If the front side 12 of the central portion 28 is convex, then it may be desirable for the rear links 14 of the adjacent module row to be shorter to maintain the desired turning radius. Otherwise, in some embodiments, movement of rear links 14 of the adjacent module row may be restricted by the convex face of the central portion 28.

The length of the links can also differ along one side of the module 6b to decrease the turning radius of the conveyor. Shorter links toward the end of the module 6b provide more space for the links to move toward the adjacent module row as the conveyor flexes. Shorter links can also prevent interference between the links and the central portion 28 of the adjacent row module as the conveyor flexes. Longer links toward the center of the module row 4 can reduce the size of the openings between each module.

Figure 9A:
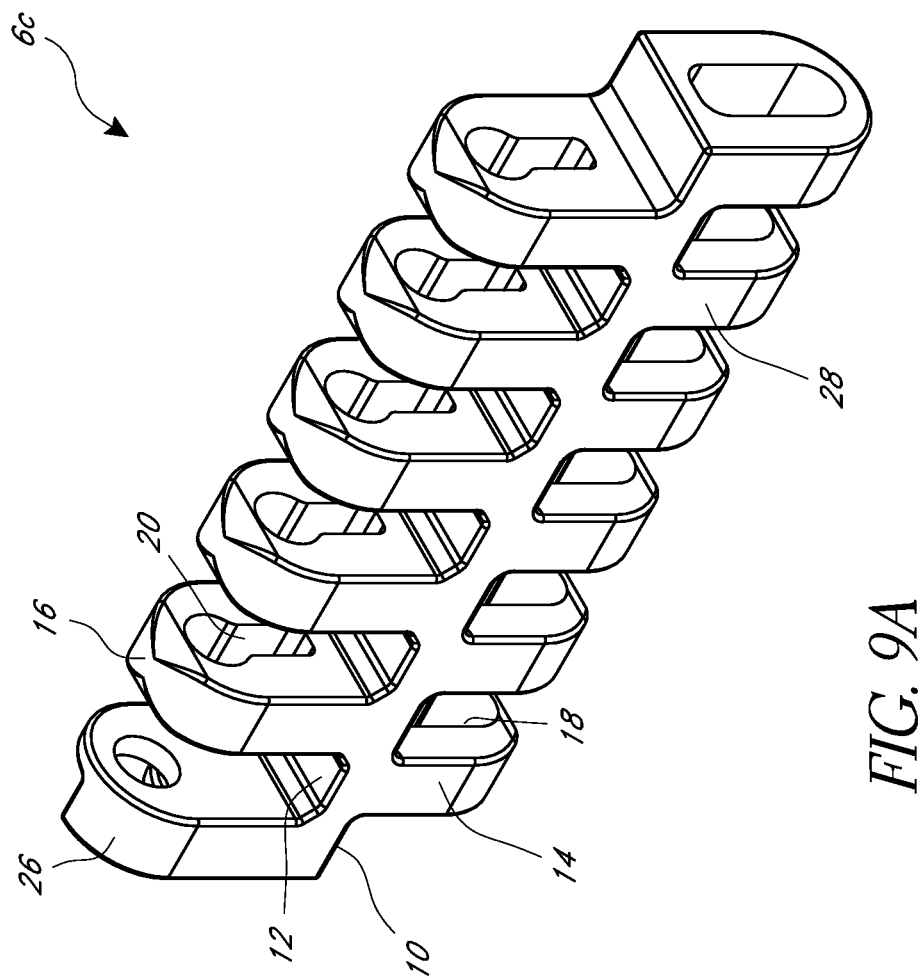
FIG. 9A illustrates a perspective view of a third module of the module row shown in FIG. 5.
Figure 9C:
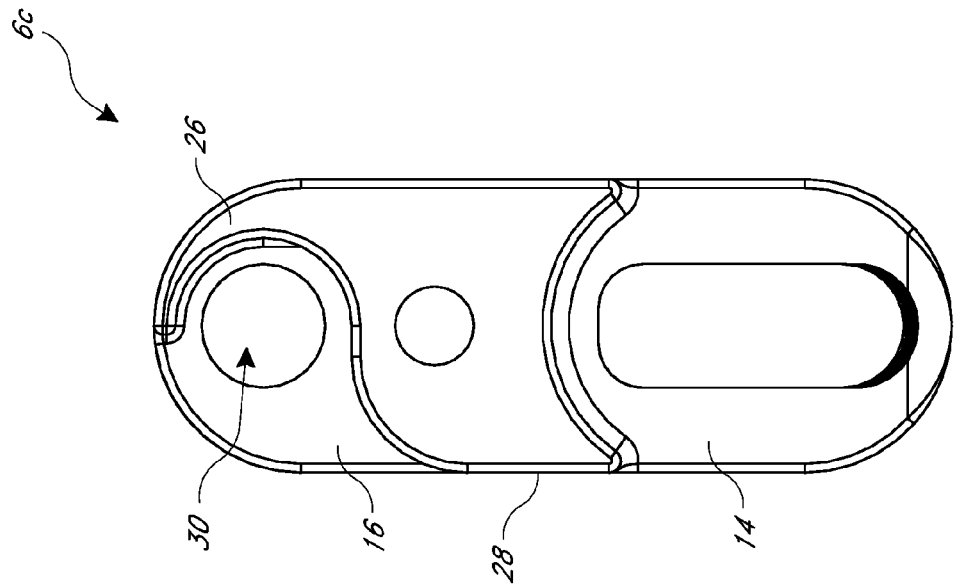
FIG. 9C illustrates another end of the third module shown in FIG. 9A.
Figure 9B:
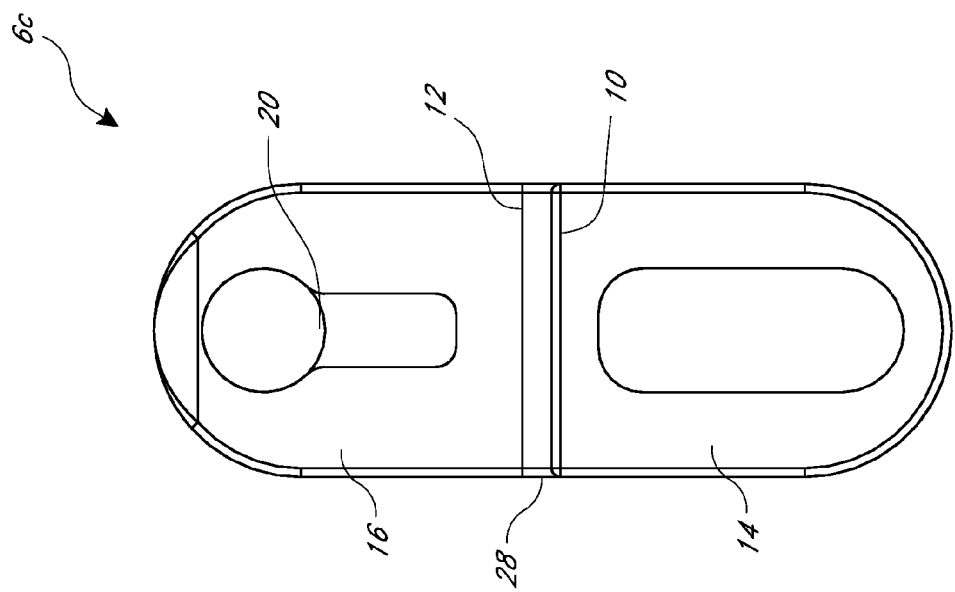
FIG. 9B illustrates an end of the third module shown in FIG. 9A.

FIGS. 9A-9C illustrate different views of the third module 6c. FIG. 9B illustrates a first end of module 6c, and FIG. 9C illustrates a second end of module 6c. The third module 6c can include any of the features described above in reference to modules 6a, 6b.

The third module 6c can include a rod-securing front link 26. The rod can include a flange portion that engages with the opening 32 in the rod-securing front link 26. The rod-securing front link 26 can be configured to restrict axial movement of the rod. As shown in FIG. 9C, the rod-securing front link 26 can include a curved lateral surface. The rod can include a tab portion positioned adjacent to the curved lateral surface when the rod is connected to module 6c. Although the front link openings 14 generally include a keyhole shaped aperture (e.g., an aperture with a general round portion and a generally slotted portion), the rod-securing front link 26 can include a circular aperture to aid in fixing the end of module 6c relative to the rod. The rod-securing front link 26 can include a second opening to permit uniform material cooling during molding. Further description of the rod-securing front link 26 can be found in U.S. Pat. No. 7,699,160 or U.S. Application Publication No. 2009/0308716, which are each incorporated by reference herein, as noted above.

Figure 10:
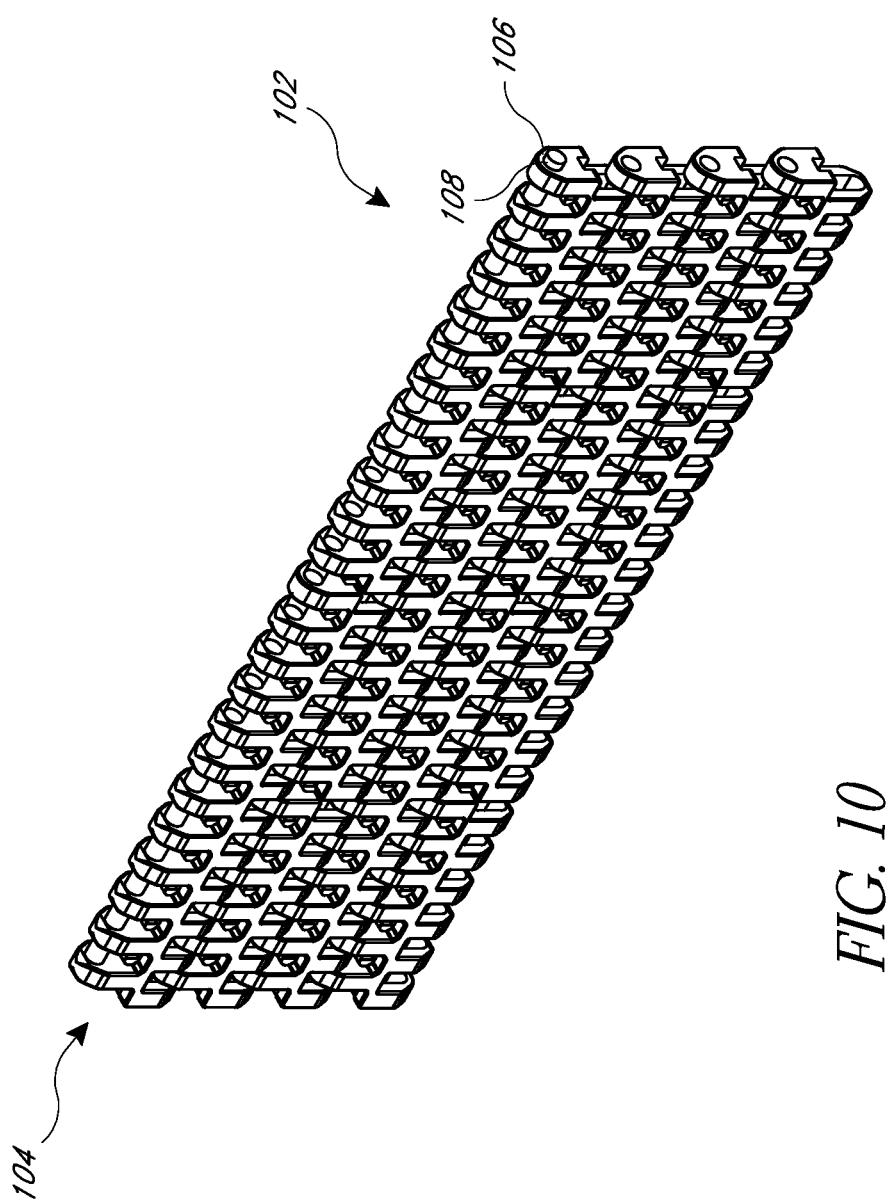
FIG. 10 illustrates a perspective view of a portion of another side-flexing conveyor in a straight configuration.
Figure 11:
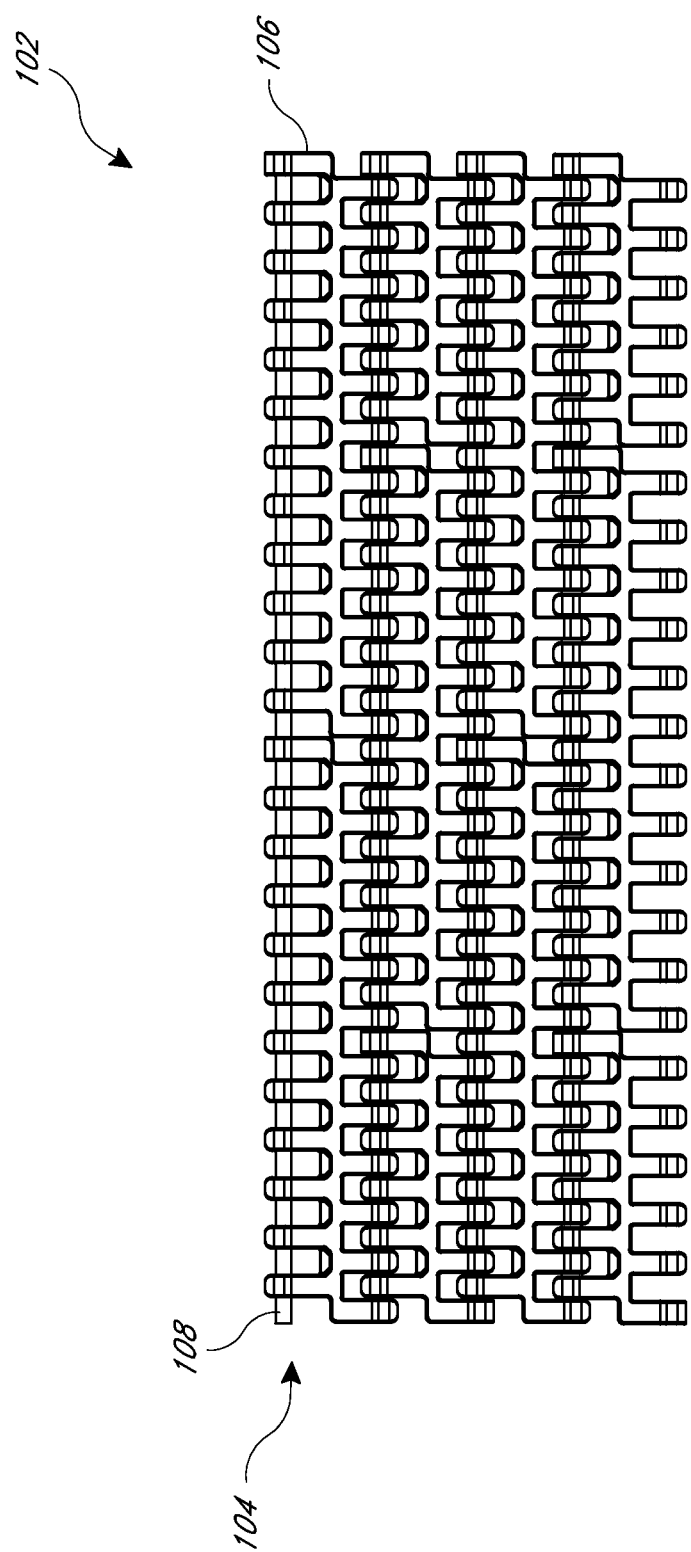
FIG. 11 illustrates a plan view of the portion of the side-flexing conveyor shown in FIG. 10.

FIGS. 10 and 11 illustrate a plurality of module rows 104 in a straight configuration. The embodiment illustrated in these figures is similar or identical to the embodiment illustrated in FIGS. 1-9 in many ways and the disclosure for those figures applies to this embodiment as well. The side-flexing conveyor 2 can include a plurality of modules 106, which can be connected together by rods 108. Each rod 108 joins two module rows 104 to increase the length of the conveyor 102, and each module row 104 can include one or more modules 106 depending on the desired width of the conveyor 102.

Figure 12:
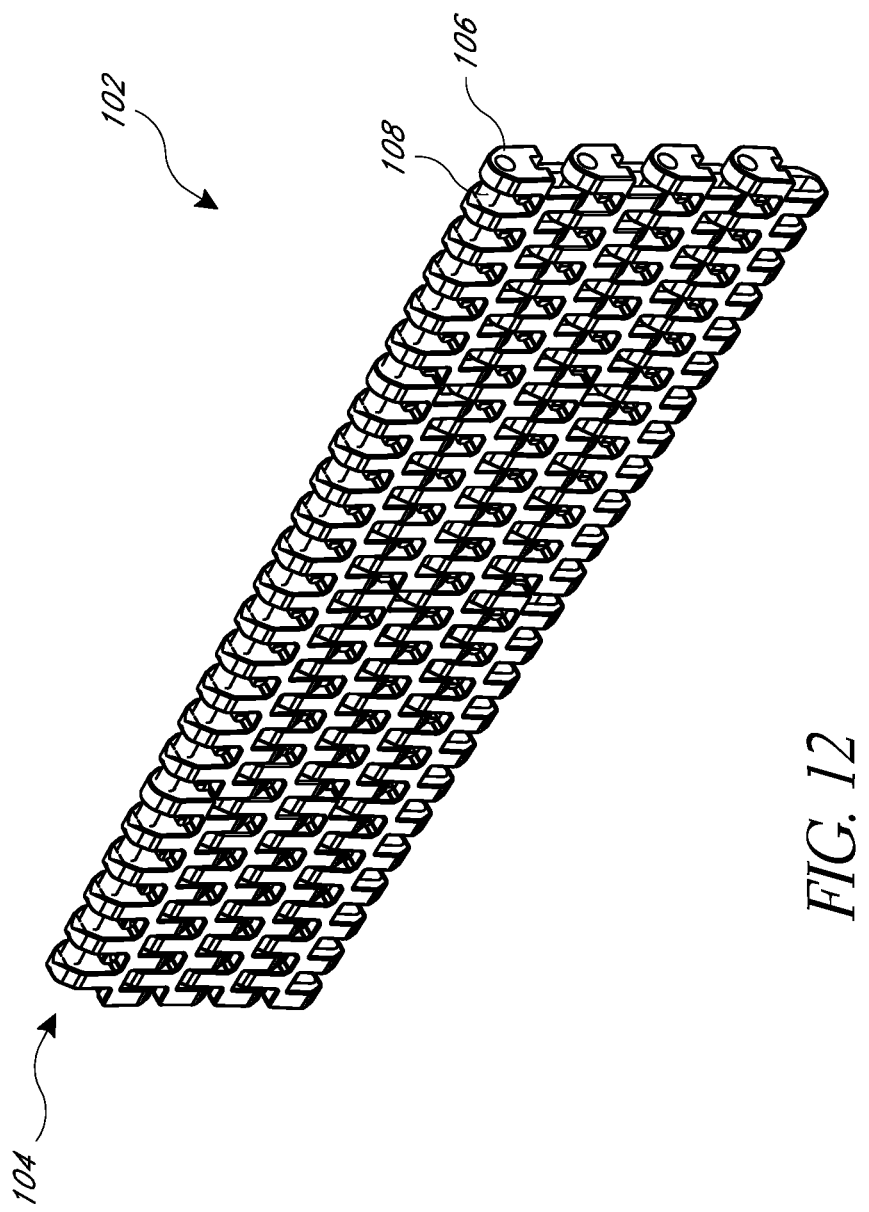
FIG. 12 illustrates a perspective view of the portion of the side-flexing conveyor shown in FIG. 10 in a flexed configuration.
Figure 13:
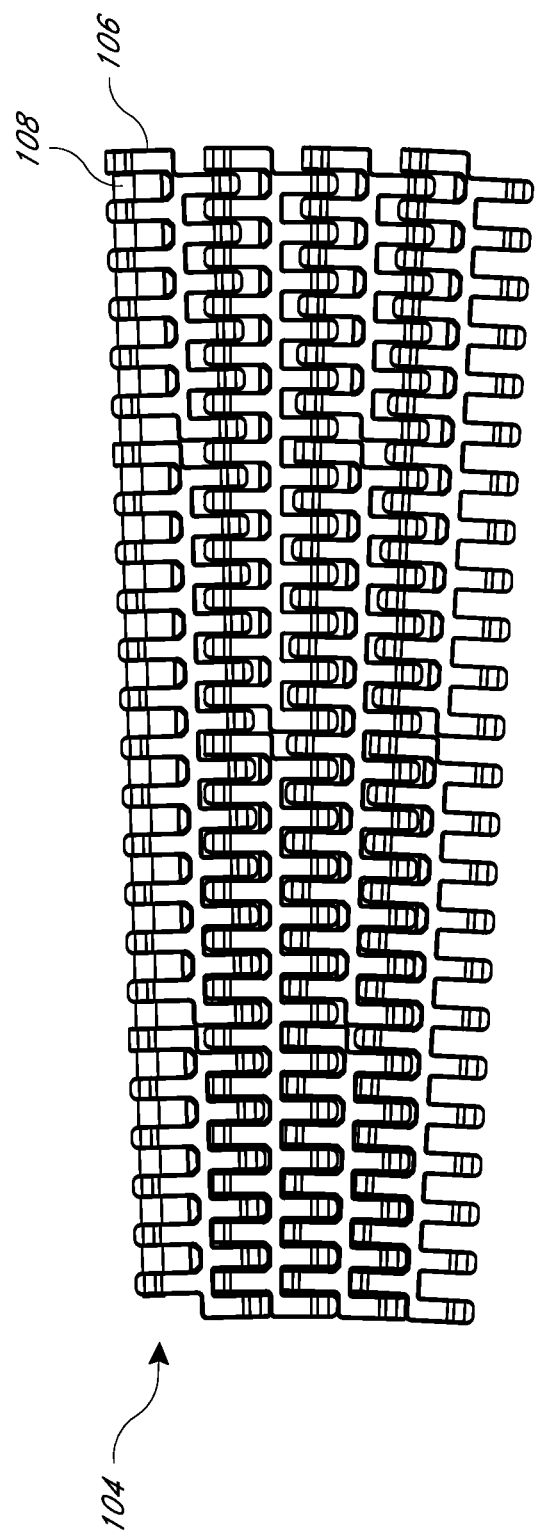
FIG. 13 illustrates a plan view of the portion of the side-flexing conveyor shown in FIG. 12.

FIGS. 12 and 13 illustrate a plurality of module rows 104 in a flexed configuration. As the conveyor 102 flexes, a portion of a first module row moves toward a second module row and reduces the space between the portion of the first module row and the second module row.

Figure 14:
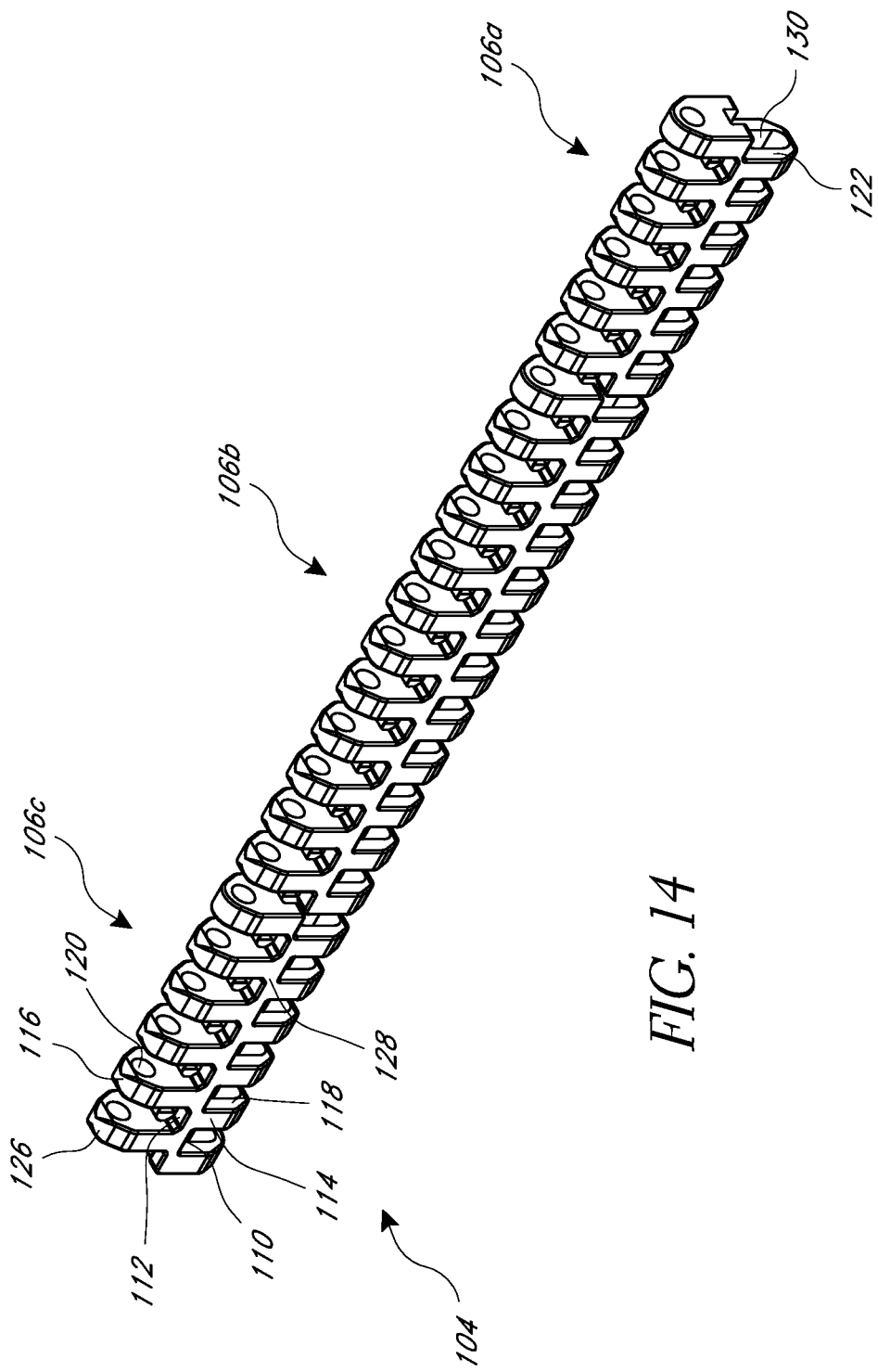
FIG. 14 illustrates a perspective view of a module row of the side-flexing conveyor shown in FIGS. 10-13.
Figure 15:
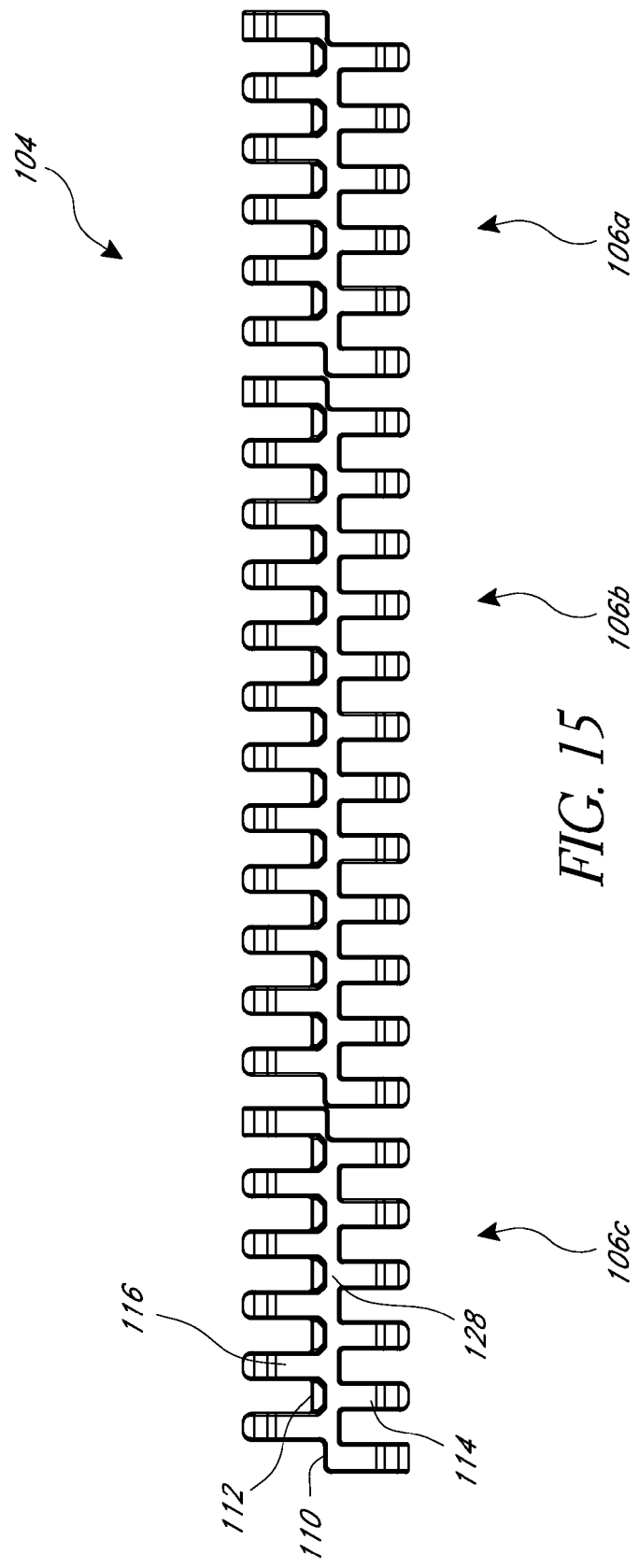
FIG. 15 illustrates a plan view of the module row shown in FIG. 14.

FIGS. 14 and 15 illustrate the module row 104. The module row 104 can include any number and combination of modules 106. For example, the illustrated module row 104 includes a first module 106a, second module 106b, and third module 106c. As shown, the row 104 includes one of each of the first, second, and third modules 106a, 106b, 106c. However, the module rows 4 can include any number and combination of modules 106a, 106b, 106c. The modules 106 can be connected together by a rod (not shown). The length of each module 106 can vary within each module row 104 and from row to row.

Modules of differing widths can be staggered to improve the strength of the conveyor. For example, as shown in FIGS. 10-13, a first module row and a third module row can include a first number of modules 106, and a second module row and a fourth module row can include a second number of modules 106. In addition, the widths of each module 106 in the first and third module rows can differ from the widths of each module 106 in the second and fourth module rows.

FIGS. 16A-D illustrate a first module 106a. The first module 106a can include any of the features of modules 6a, 6b, or 6c described herein. As shown in FIGS. 16A-D, the first module 106a can include an axial aperture 134 extending through the central portion 128. The axial aperture 134 can reduce the total amount of material in the first module 106a. This can reduce the weight of the module 106a, reduce cost, or provide other benefits. In some embodiments, the axial aperture 134 can facilitate manufacturing of the module 106a, such as by promoting more uniform heat transfer (e.g., cooling) of the module 106a during forming operations, such as molding. In various implementations, the axial aperture 134 does not substantially reduce the strength of the module 106a. For example, in certain variants, the axial aperture 134 does not reduce the tension strength of the module 106a more than about 10%.

As shown, a plurality of rear links 114 can extend from a rear side 110 of a central portion 128 and a plurality of front links 116 extend from a front side 112 of the central portion 128. The plurality of links can be at least about: two links, three links, six links, twelve links, or any other number of links.

Each rear link 114 can include an aperture 118. The rear link aperture 118 is shaped and sized to permit the rear link 114 to move relative to the rod 8. For example, the rear links 114 can include an elongated aperture.

Figure 18A:
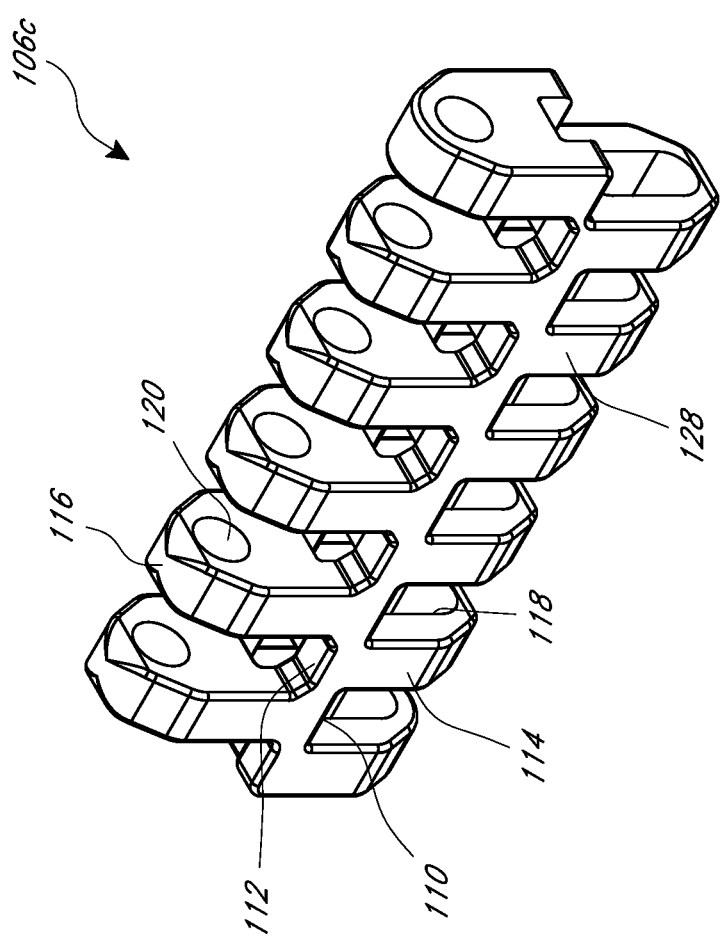
FIG. 18A illustrates a perspective view of another module of the module row shown in FIG. 14.
Figure 18C:
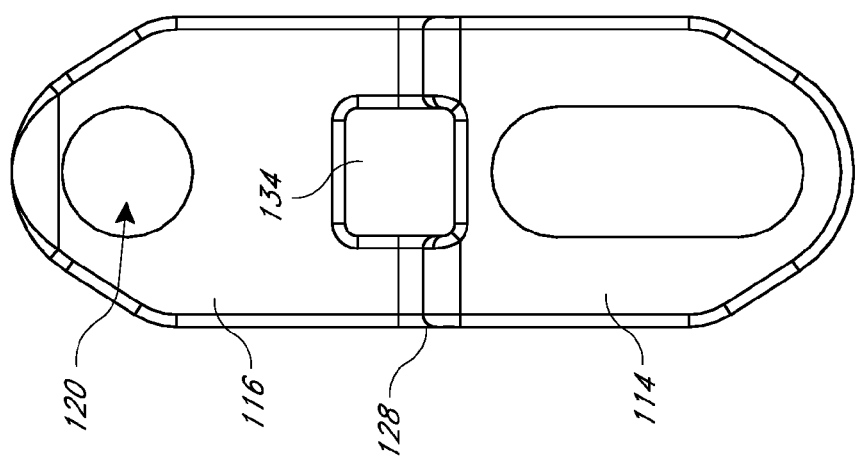
FIG. 18C illustrates another end of the module shown in FIG. 18A.
Figure 18B:
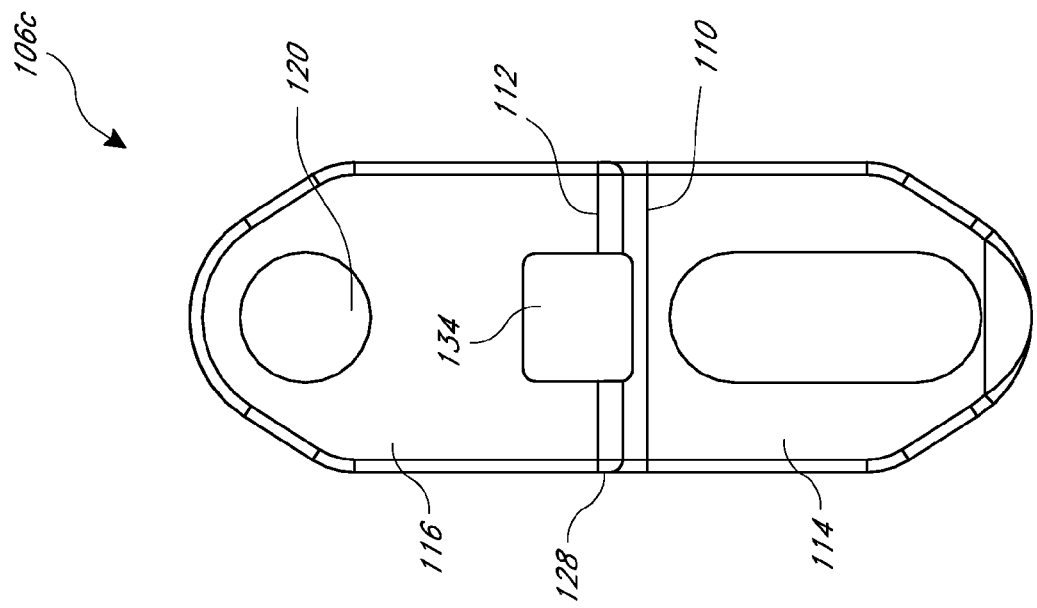
FIG. 18B illustrates an end of the module shown in FIG. 18A.

Each front link 116 can include an aperture 120. As shown in FIG. 18A, the front link aperture 120 is rounded to fix the position of the front link 116 relative to the rod 108. Fixing the front links 116 relative to the rod 108 provides better control as the conveyor 102 moves through the curved track section. The front links can also include a second aperture to minimize the total amount of material.

Figure 16A:
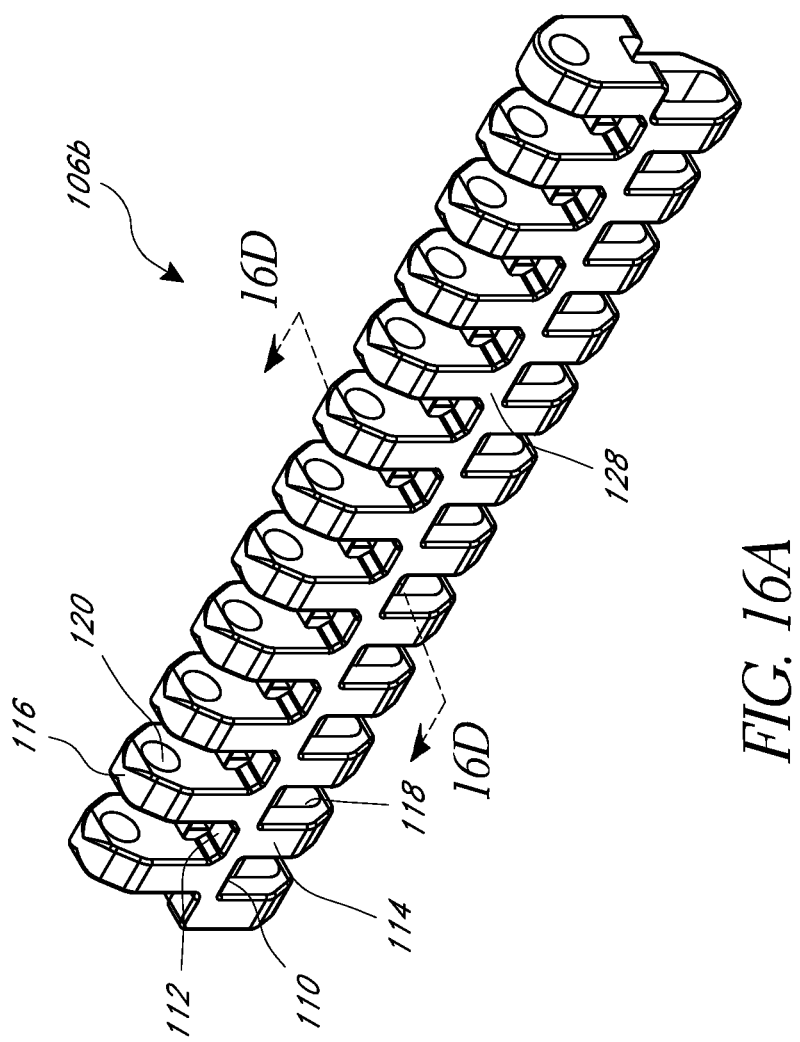
FIG. 16A illustrates a perspective view of a module of the module row shown in FIG. 14.
Figure 16C:
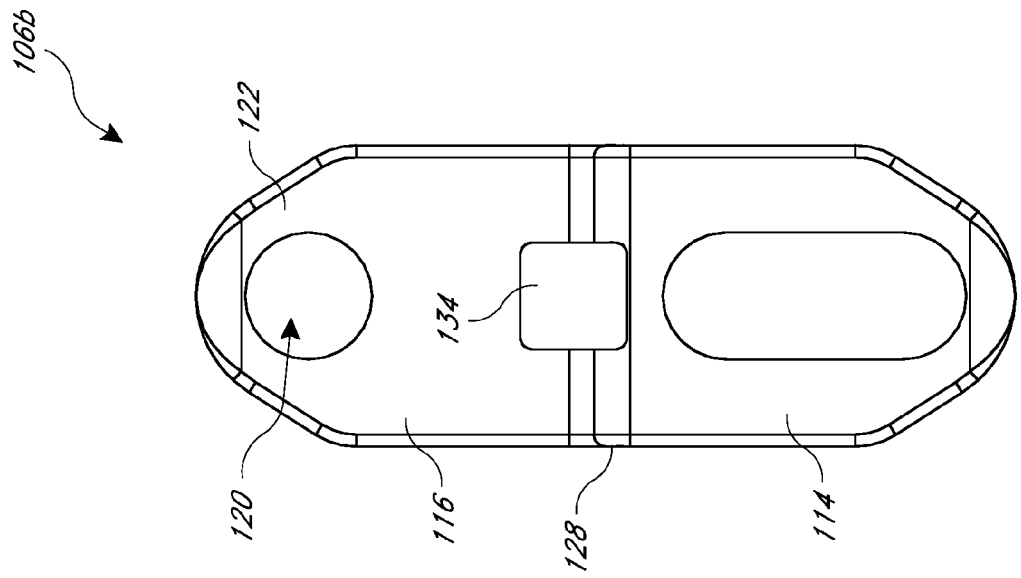
FIG. 16C illustrates another end of the module shown in FIG. 16A.
Figure 16B:
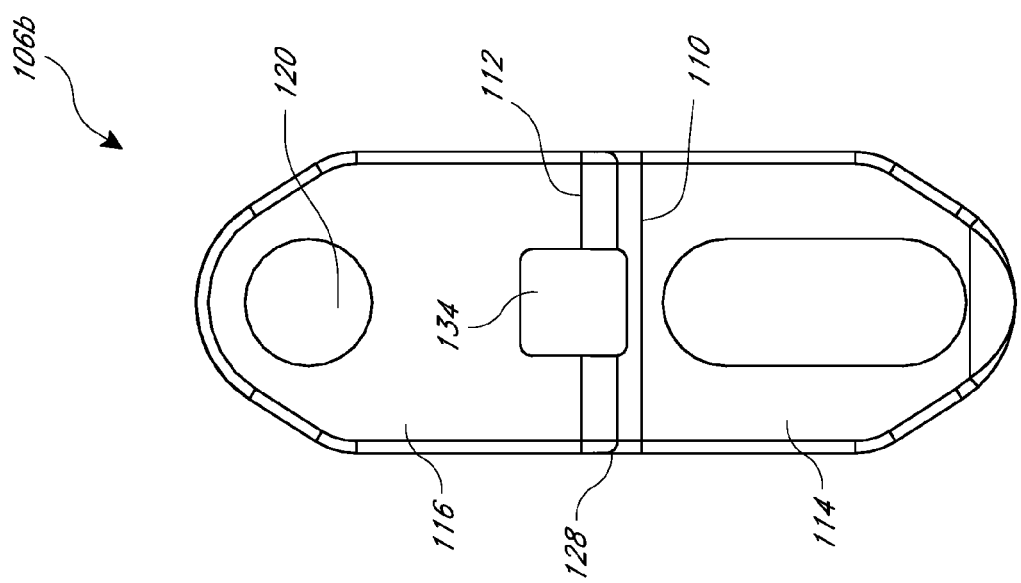
FIG. 16B illustrates an end of the module shown in FIG. 16A.

As shown in FIGS. 16B-C, the rear links 114 and front links 116 can include a chamfer edge. The chamfer edge can aid in allowing the links to move further toward the adjacent module row and/or can decrease the radius ratio.

Figure 16D:
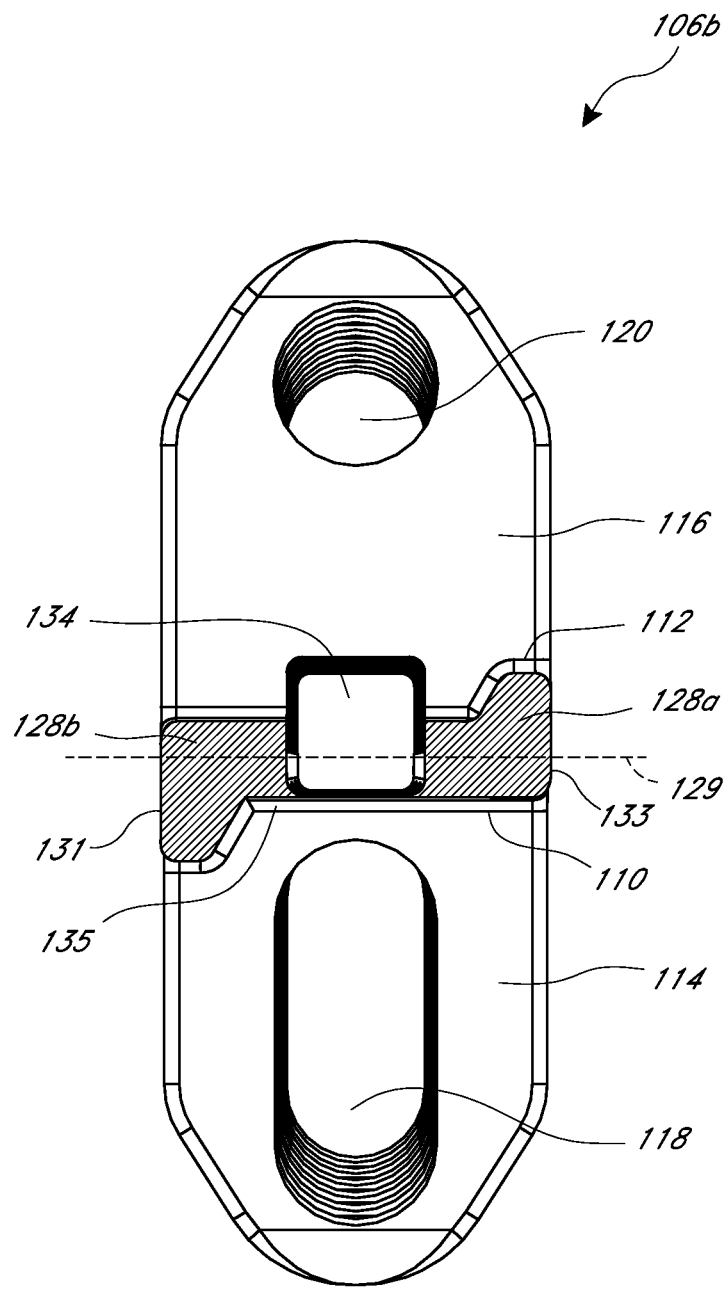
FIG. 16D illustrates a cross section of the module shown in FIG. 16A through line 16D-16D.
Figure 17A:
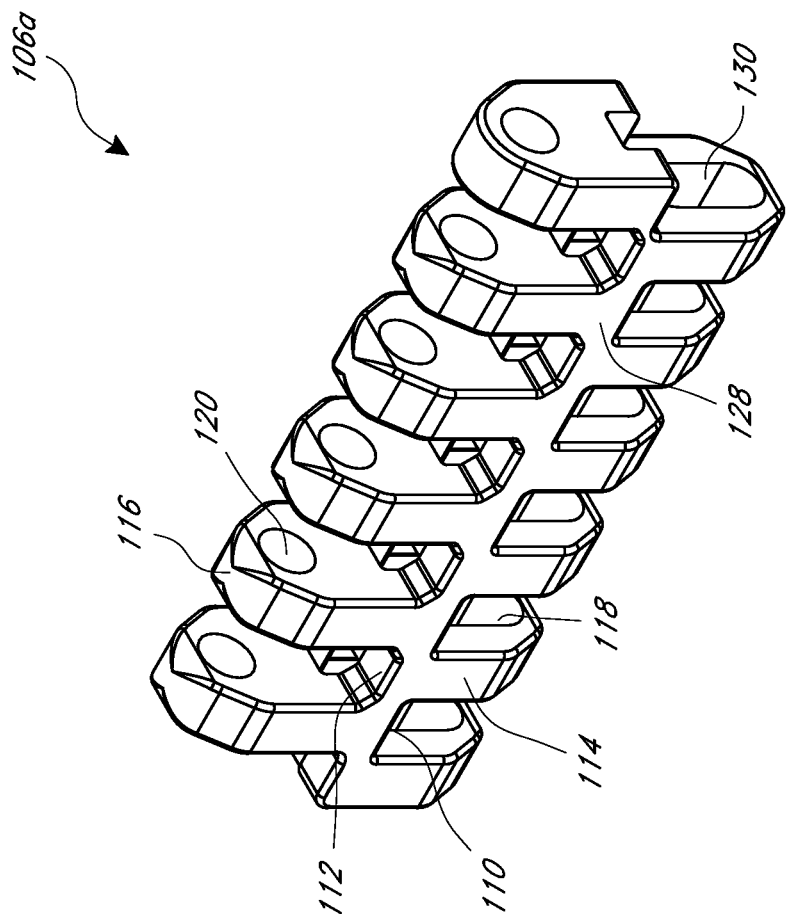
FIG. 17A illustrates a perspective view of another module of the module row shown in FIG. 14.
Figure 17C:
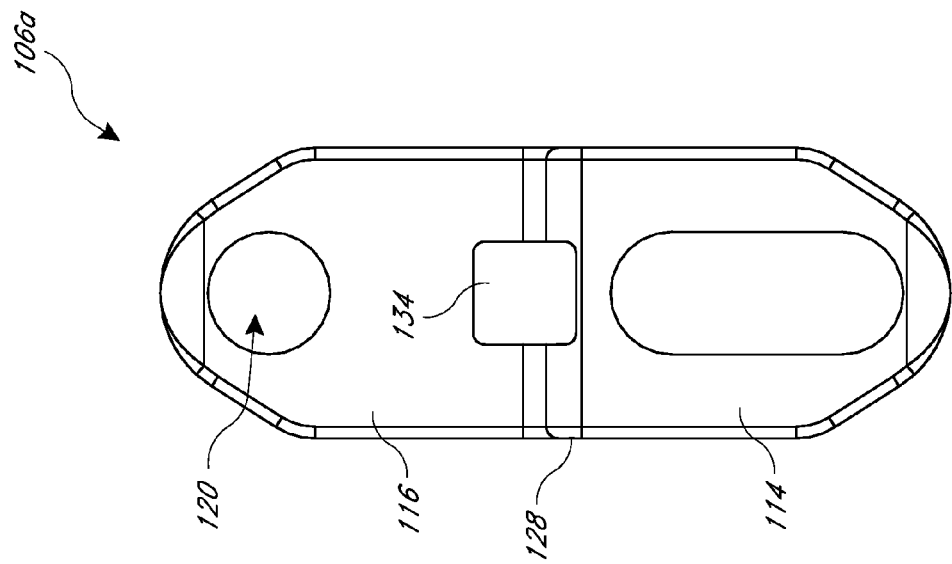
FIG. 17C illustrates another end of the module shown in FIG. 17A.
Figure 17B:
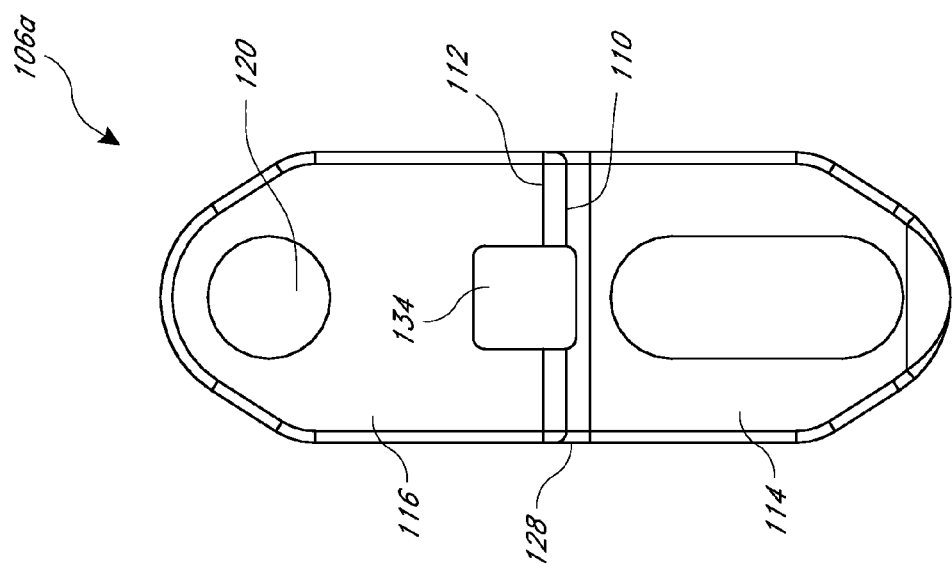
FIG. 17B illustrates an end of the module shown in FIG. 17A.

As shown in FIG. 16D, the central portion 128 can be asymmetrical along a generally vertical axis of the first module 106a when positioned on a track (along an axis 129 extending generally from the left side to the right side in FIG. 16D). The central portion 128 can have a first portion 128a and a second portion 128b. In some embodiments, as illustrated, the first portion 128a is positioned at or near a top surface of the first module 106a and the second portion 128b is position at or near a bottom surface of the module 106a. On a first side, an edge of one of these portions can extend further in one direction that is generally in the longitudinal plane of the first module 106a (e.g., the plane of the direction of travel of the module 106a) than an edge of the other portion. In some embodiments, on an opposing second side of the first module 106a, the portion that has the recessed edge on the first side can comprise an edge on the second side that can extend further in a generally opposite direction in the longitudinal plane of the first module 106a than an edge of the other portion.

For example, as illustrated, a front edge of the first portion 128a can extend further in the forward direction beyond a front edge of the second portion 128b; and a rear edge of the second portion 128b can extend further in the rearward direction beyond a rear edge of the first portion 128a. In some embodiments, the first portion 128a can extend further in the rearward direction than the second portion 128b and/or the second portion 128b can extend further in the forward direction than the first portion 128a. In some embodiments, a single segment of the central portion 128 can extend beyond another segment of the central portion on one side, but the opposing side can comprise an edge extending generally vertically across the first module 106a with a generally even edge that extends generally from top to bottom of the first module 106a. As illustrated, the asymmetrical central portion 128 can permit adjacent module rows to move closer together to improve the turning radius, while still maintaining the strength of the conveyor.

For example, by providing the front edge of the second portion 128b in a recessed position behind the front edge of the first portion 128a, the abutting rear edge of a link of an adjacent module in front of the first module 106a can move in more closely to the generally vertical midline 129 of the first module 106a, especially during turning or side flexing. Also, at least one and/or at least two generally thicker portions at or near the top surface 131 and/or at or near the bottom surface 133 of the first module 106a can provide stability and structural strength. In some embodiments, as illustrated, the height of the top surface 131 (e.g., the distance from the front edge to the rear edge) is larger than, such as at least about twice as large as, the height of the intermediate section 135. In some embodiments, the height of the bottom surface 133 can be larger than, such as at least about twice as large as, the height of the intermediate portion 135. As shown, the height of the top surface 131 can be about the same as the height of the bottom surface 133.

An asymmetrical design, as in the illustrated example, can also simplify and diminish the cost of manufacturing by permitting the first module 106a to be injection molded in a process that comprises a generally vertical top mold portion that generally approaches from the left (top) side in FIG. 16D and a generally vertical bottom portion that generally approaches from the right (bottom) side of FIG. 16D, with each mold portion being tapered in only one direction (either increasing or decreasing in width from front to back, which is illustrated as top to bottom in FIG. 16D) as it progresses along a generally vertical axis. This single direction of tapering can reduce or eliminate one or more additional mold pieces that may otherwise be need to be inserted from the front or rear of the first module 106a (e.g., from the top or bottom in FIG. 16D), as may be necessary if the intermediate portion 135 were to taper inward and then outward on the side along a vertical axis. The more complex molding process with more than two main mold pieces may be used in manufacturing some embodiments of module 6c, as illustrated in FIG. 9c, for example.

In some embodiments, the central portion 128 can be generally symmetrical. The central portion 128 can include a chamfer edge (not shown) along the front side 112 and/or the rear side 110 of the central portion 128. The chamfer edge allows the first module 106a to move closer to the adjacent module row 104 when the conveyor 102 moves along the curved track section, which decreases the radius ratio of the conveyor. In some embodiments, the chamfer edge reduces or minimizes the total amount of material in the module and/or diminishes the cost of the product.

FIGS. 17A-C and 18A-C illustrate different views of the second and third modules 106b and 106c. The second and third modules 106b, 106c can include any of the features described above in reference to first module 106a or any of the modules 6a-c. The second and third modules 106b, 106c can include the same number or a different number of links as the first module 106a.

Although the present disclosure has been described in terms of certain illustrative embodiments and uses, other embodiments and other uses that are apparent to those of ordinary skill in the art, including embodiments and uses which do not provide all of the features and advantages set forth herein, are also within the scope of the present disclosure. Components, elements, features, acts, or steps can be arranged or performed differently than described and components, elements, features, acts, or steps can be combined, merged, added, or left out in various embodiments. For example, any of the features of module 6a can be included in modules 6b and/or 6c, any of the features of module 6b can be included in modules 6a and/or 6c, and any of the features of module 6c can be included in modules 6a and/or 6b. Indeed, all possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

Some embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

In summary, various embodiments and examples of side-flexing conveyors have been disclosed. Although the side-flexing conveyors have been disclosed in the context of those embodiments and examples, it will be understood by those skilled in the art that this disclosure extends beyond the specifically disclosed embodiments to other alternative embodiments and/or other uses of the embodiments, as well as to certain modifications and equivalents thereof. For example, some embodiments can be configured to be used with other types of conveyor systems or configurations. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow.

The following is claimed:

1. A conveyor adapted to travel through straight and curved paths, the conveyor comprising:
    a plurality of modules, each of the modules having a width, height, and thickness, the width extending between a first lateral side of the module and a second lateral side of the module, the height extending between a top surface of the module and a bottom surface of the module, the thickness extending generally parallel to the direction of travel of the conveyor between a leading portion of the module and a trailing portion of the module, each of the modules comprising:
        a spine extending from the first lateral side of the module to the second lateral side of the module, the spine having a thickness extending from a front edge to a rear edge;
        wherein the spine comprises a continuous straight portion that extends from the first lateral side to the second lateral side along a line drawn between a first point within the thickness of the spine at the first lateral side and a second point within the thickness of the spine at the second lateral side;
        a plurality of front links extending generally perpendicular to the spine, each of the plurality of front links having a first end connected with the front edge of the spine and a second end opposite the first end, the second end terminating in a front tip, the second end having a width that is less than or equal to the width of the front link at the first end;
        wherein each of the front links has a front link length, the front link length being measured from the front edge of the spine to the corresponding front tip, the front link length of each of the front links being generally equal;
        a plurality of front gaps, each of the plurality of front gaps bounded by a portion of the front edge of the spine and by lateral sides of adjacent front links;
        a plurality of first front apertures, each of the plurality of front links including one of the first front apertures;

a plurality of second front apertures, each of the plurality of front links including one of the second front apertures, wherein the first and second front apertures intersect, the first front apertures having a first height and the second front apertures having a second height that is not equal to the first height;

a plurality of rear links extending generally perpendicular to the spine, each of the plurality of rear links having a first end connected with the rear edge of the spine and a second end opposite the first end, the second end terminating in a rear tip, the second end having a width that is less than or equal to the width of the rear link at the first end;

wherein each of the rear links has a rear link length, the rear link length being measured from the rear edge of the spine to the corresponding rear tip, the rear link length of each of the rear links being generally equal;

a plurality of rear gaps, each of the plurality of rear gaps bounded by a portion of the rear edge of the spine and by lateral sides of adjacent rear links;

a plurality of a rear apertures, each of the plurality of rear links including one of the rear apertures, the rear apertures being elongate in cross-sectional shape;

wherein each of the front gaps is configured to receive one of the rear links of a frontwardly-adjacent module, and each of the rear gaps is configured to receive one of the front links of a rearwardly-adjacent module; and a plurality of rods, wherein each rod is configured to extend through each of the front apertures of a first module and extend through each of the rear apertures of a second module, thereby pivotally connecting the first and second modules;

whereby the first and second modules are each configured to slide and twist relative to each other within a plane of travel of the conveyor, thereby facilitating flexing of the conveyor through curved paths.

2. The conveyor of claim 1, wherein the plurality of modules are arranged in a brick-lay pattern.

3. The conveyor of claim 1, wherein the thickness of the spine is generally constant at the top surface of the module.

4. The conveyor of claim 1, wherein each of the front links is generally continuous between the top surface and the bottom surface.

5. The conveyor of claim 4, wherein each of the front links does not include a generally vertical hole extending through the top and bottom surfaces of the module.

6. The conveyor of claim 1, wherein the thickness of the spine is generally constant between the top surface and the bottom surface of the module.

7. The conveyor of claim 1, wherein each of the second front apertures is sized so as to inhibit the rod from entering the second front aperture.

8. The conveyor of claim 7, wherein, in each front link, the front aperture and the second aperture together form a keyhole shape.

9. The conveyor of claim 1, wherein at least a majority of a top surface of the spine is generally planar.

10. The conveyor of claim 1, wherein the spine is asymmetrical along a cross section taken perpendicular to the top surface and parallel to the direction of travel the conveyor.

11. The conveyor of claim 1, wherein the first front aperture is a round hole.

12. The conveyor of claim 1, wherein each first front aperture includes a bearing edge, and wherein at least two bearing edges form a linear progression at an angle of less than or equal to about 1° relative to a longitudinal centerline of the spine.

13. The conveyor of claim 1, wherein at least one of the modules includes a rod securing link with an opening configured to receive an end of one of the rods.

14. The conveyor of claim 1, wherein an end portion of at least one front link is tapered toward the front tip.

15. The conveyor of claim 1, wherein a majority of the front links include a uniform shape.

16. The conveyor of claim 1, wherein an end portion of at least one rear link is tapered.

17. The conveyor of claim 1, wherein a majority of the rear links include a uniform shape.

18. A conveyor belt that is adapted to travel along straight and curved paths, the conveyor belt comprising:

a plurality of rows of belt modules extending from a first lateral side of the conveyor to a second lateral side of the conveyor belt; and a plurality of rods, each of the rods comprising a flange and configured to pivotally interlock adjacent rows of the belt modules;

wherein each row of belt modules comprises a first module, a second module laterally adjacent a first side of the first module, and a third module laterally adjacent a second side of the first module, each of the first, second, and third modules comprising:

a spine extending between a top surface and a bottom surface, the spine comprising a continuous straight portion extending from a first lateral side of the module to a second lateral side of the module, the spine having a thickness extending generally in the direction of belt travel between a front edge and a rear edge;

a plurality of front links connected with the front edge of the spine and extending generally perpendicular to the spine, each of the plurality of front links having a front end;

a plurality of front apertures configured to receive one of the rods, each of the plurality of front links including one of the front apertures, the front apertures having an elongate cross-sectional shape;

a plurality of rear links connected with the rear edge of the spine and extending generally perpendicular to the spine, each of the plurality of rear links having a rear end; and a plurality of a rear apertures configured to receive one of the rods, each of the plurality of rear links including one of the rear apertures;

wherein the third module further comprises a rod-securing front link located at the first lateral side of the conveyor and extending generally parallel to the plurality of front links, the rod-securing front link comprising an opening configured to receive one of the rods, the opening having a circular cross-sectional shape, the rod-securing front link being configured to facilitate fixing the rod with respect to the third module, thereby inhibiting the rod from moving laterally relative to the row of belt modules.

19. The conveyor belt of claim 18, wherein the thickness of the spine is generally constant at at least one of the top and bottom surfaces.

20. The conveyor belt of claim 19, wherein the thickness of the spine is generally constant at the top and bottom surfaces.

21. The conveyor belt of claim 18, wherein the front end has a width that is less than or equal to the width of the corresponding front link, and the rear end has a width that is less than or equal to the width of the corresponding rear link.

22. The conveyor belt of claim 18, wherein the front links of each of the first, second, and third modules further comprise a second front aperture.

23. The conveyor belt of claim 18, wherein the front apertures have a key-hole shape.

24. A conveyor adapted to travel through straight and curved paths, the conveyor comprising:
- a plurality of modules, each of the modules having a width, height, and thickness, the width extending between a first lateral side of the module and a second lateral side of the module, the height extending between a top surface of the module and a bottom surface of the module, the thickness extending generally parallel to the direction of travel of the conveyor between a leading portion of the module and a trailing portion of the module, each of the modules comprising:
  - a spine extending from the first lateral side of the module to the second lateral side of the module, the spine having a thickness extending from a front edge to a rear edge;
  - wherein the spine comprises a continuous straight portion that extends from the first lateral side to the second lateral side along a line drawn between a first point within the thickness of the spine at the first lateral side and a second point within the thickness of the spine at the second lateral side;
  - a plurality of front links extending generally perpendicular to the spine, each of the plurality of front links having a first end connected with the front edge of the spine and a second end opposite the first end, the second end terminating in a front tip, the second end having a width that is less than or equal to the width of the front link at the first end;
  - wherein each of the front links has a front link length, the front link length being measured from the front edge of the spine to the corresponding front tip, the front link length of each of the front links being generally equal;
  - a plurality of front gaps, each of the plurality of front gaps bounded by a portion of the front edge of the spine and by lateral sides of adjacent front links;
  - a plurality of first front apertures, each of the plurality of front links including one of the first front apertures;
  - a plurality of second front apertures, each of the plurality of front links including at least a portion of one of the second front apertures, the second front apertures configured to reduce the weight of the module and being spaced apart from the first front apertures, a portion of the second front apertures being positioned in the spine;
  - a plurality of rear links extending generally perpendicular to the spine, each of the plurality of rear links having a first end connected with the rear edge of the spine and a second end opposite the first end, the second end terminating in a rear tip, the second end having a width that is less than or equal to the width of the rear link at the first end;
  - wherein each of the rear links has a rear link length, the rear link length being measured from the rear edge of the spine to the corresponding rear tip, the rear link length of each of the rear links being generally equal;
  - a plurality of rear gaps, each of the plurality of rear gaps bounded by a portion of the rear edge of the spine and by lateral sides of adjacent rear links;
  - a plurality of a rear apertures, each of the plurality of rear links including one of the rear apertures, the rear apertures being elongate in cross-sectional shape;
  - wherein each of the front gaps is configured to receive one of the rear links of a frontwardly-adjacent module, and each of the rear gaps is configured to receive one of the front links of a rearwardly-adjacent module; and
- a plurality of rods, wherein each rod is configured to extend through each of the front apertures of a first module and extend through each of the rear apertures of a second module, thereby pivotally connecting the first and second modules;
- whereby the first and second modules are each configured to slide and twist relative to each other within a plane of travel of the conveyor, thereby facilitating flexing of the conveyor through curved paths.

\* \* \* \* \*